United States Patent [19]

Arakawa et al.

[11] Patent Number: 4,883,961

[45] Date of Patent: Nov. 28, 1989

[54] RADIATION IMAGE RECORDING AND READ-OUT APPARATUS

[75] Inventors: Satoshi Arakawa; Yuichi Hosoi; Kenji Takahashi; Kaoru Tamura; Shigeru Satome, all of Kanagawa, Japan

[73] Assignee: Fuji Photo Film Co., Ltd., Kanagawa, Japan

[21] Appl. No.: 145,180

[22] Filed: Jan. 19, 1988

[30] Foreign Application Priority Data

| Jan. 16, 1987 | [JP] | Japan | 62-8571 |
| Feb. 2, 1987 | [JP] | Japan | 62-21957 |
| Apr. 17, 1987 | [JP] | Japan | 62-94548 |
| Sep. 9, 1987 | [JP] | Japan | 62-226174 |
| Oct. 5, 1987 | [JP] | Japan | 62-251268 |
| Oct. 14, 1987 | [JP] | Japan | 62-259115 |

[51] Int. Cl.$^4$ .............................. G01N 23/04
[52] U.S. Cl. .............................. 250/327.2
[58] Field of Search .............. 250/484.1, 327.2

[56] References Cited

U.S. PATENT DOCUMENTS

| Re. 31,847 | 3/1987 | Luckey | 250/337 |
| 3,777,163 | 12/1973 | Aubin et al. | 250/491 |
| 4,258,264 | 3/1981 | Kotera et al. | 250/327.2 |
| 4,517,463 | 5/1985 | Gasiot et al. | 250/327.2 E |
| 4,629,890 | 12/1986 | Goto et al. | 250/327.2 F |
| 4,691,232 | 9/1987 | Lange | 358/111 |

FOREIGN PATENT DOCUMENTS

| 0125800 | 4/1984 | European Pat. Off. |  |
| 0209119 | 7/1986 | European Pat. Off. |  |
| 59-11395 | 2/1981 | Japan | 250/327.2 |
| 0117476 | 7/1983 | Japan | 250/337 |
| 0117057 | 7/1984 | Japan | 250/361 R |

Primary Examiner—Janice A. Howell
Assistant Examiner—William F. Rauchholz
Attorney, Agent, or Firm—Sughrue, Mion, Zinn, Macpeak & Seas

[57] ABSTRACT

A radiation image recording and read-out apparatus comprises a read-out and erasing unit provided with an image read-out device for irradiating stimulating rays to an image-recorded stimulable phosphor sheet and detecting light emitted by the stimulable phosphor sheet upon exposure to stimulating rays, and a device for erasing radiation energy remaining on the stimulable phosphor sheet. The read-out and erasing unit is reciprocated normal to the direction of irradiation of stimulating rays for carrying out image read-out during forward movement, and carrying out erasing by the erasing device during backward movement. The read-out and erasing unit may be provided with two erasing devices on either side of the image read-out device for carrying out image read-out by the image read-out device and erasing by the erasing device positioned on the upstream side of the image read-out device during forward movement, and carrying out image read-out by the image read-out device and erasing by the other erasing device positioned on the upstream side of the image read-out device during backward movement.

20 Claims, 25 Drawing Sheets

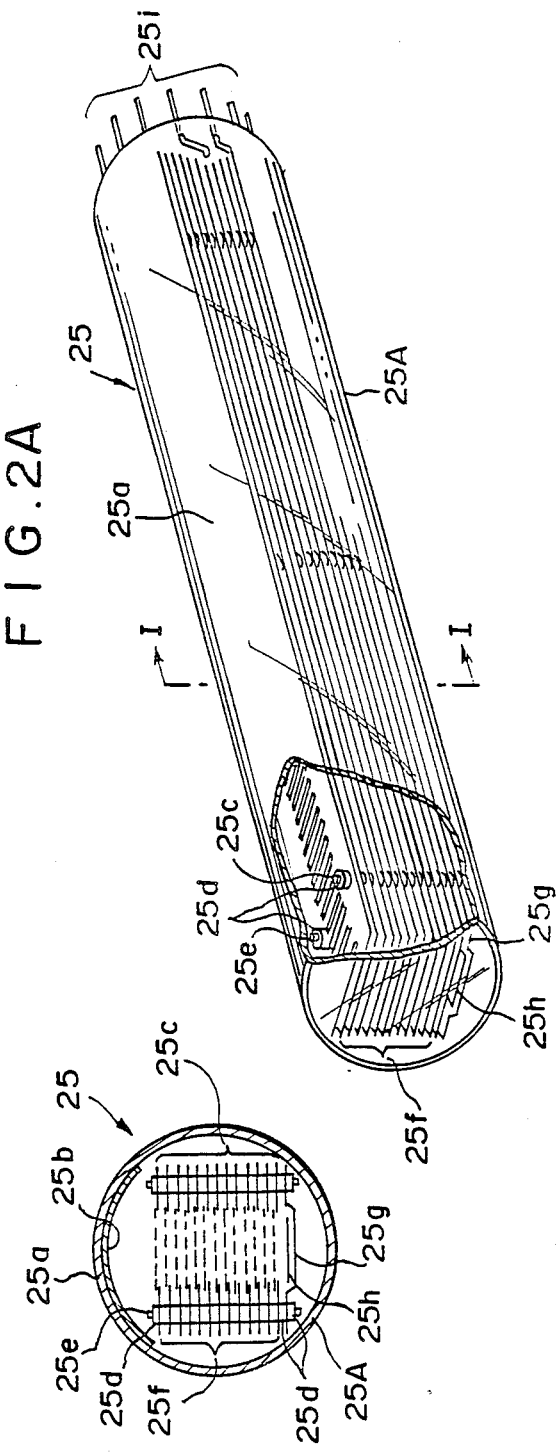

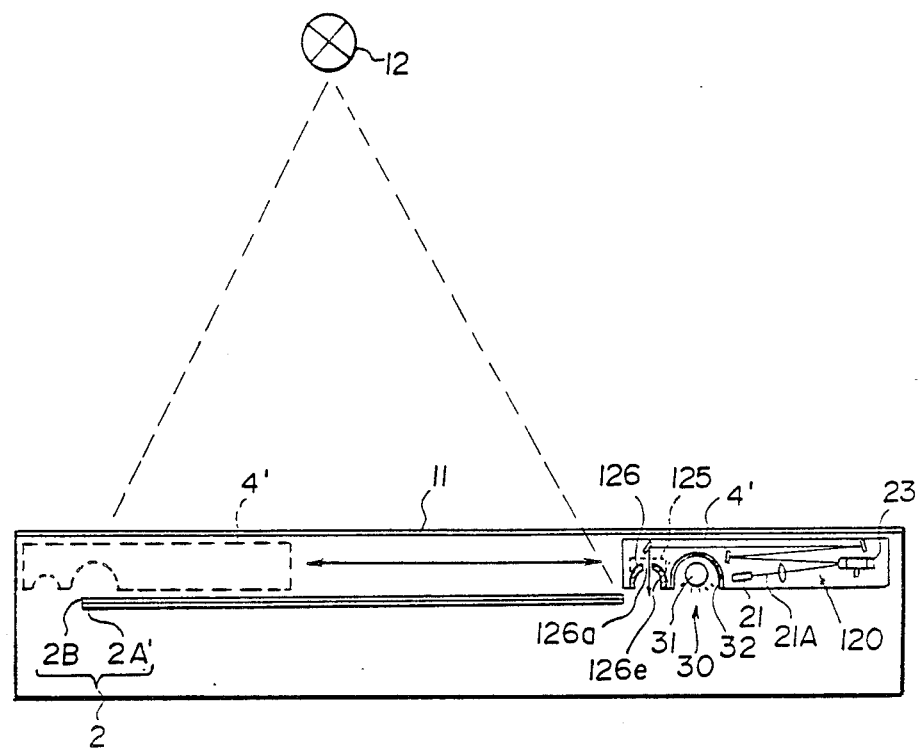
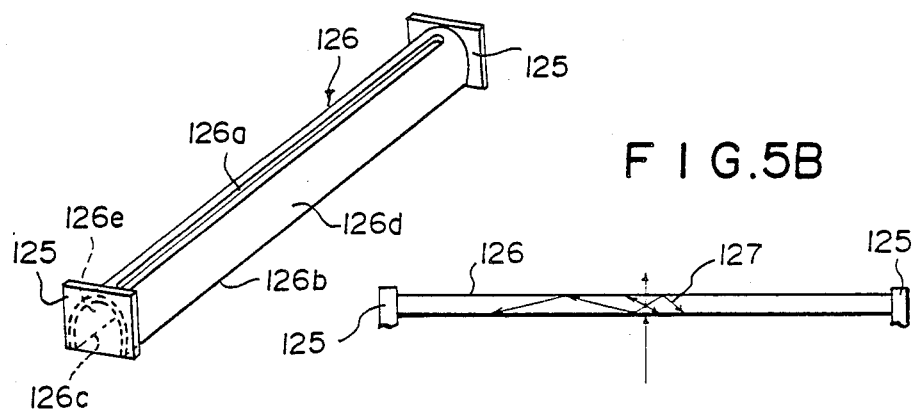

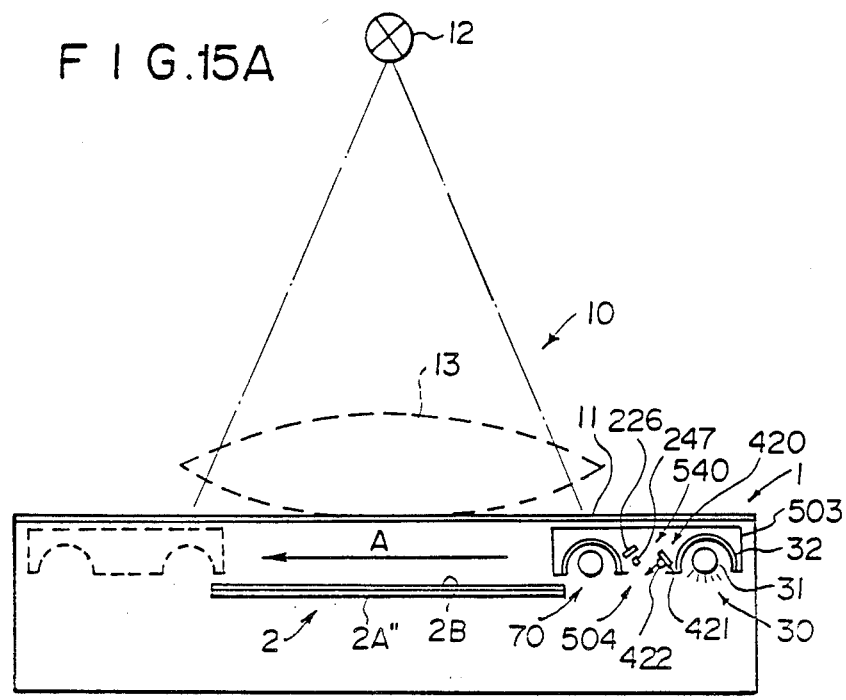
F I G. 15A
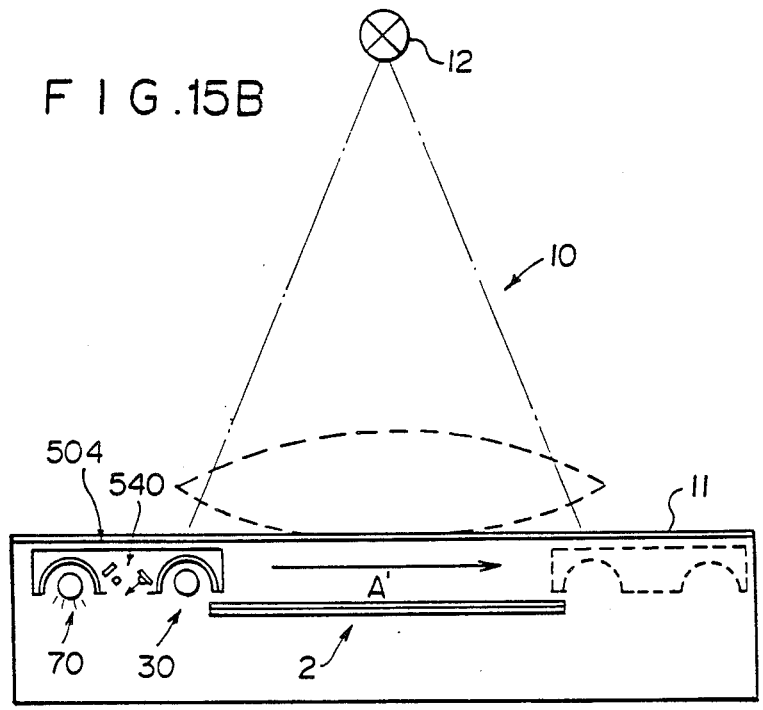
F I G. 15B

F I G. 20A
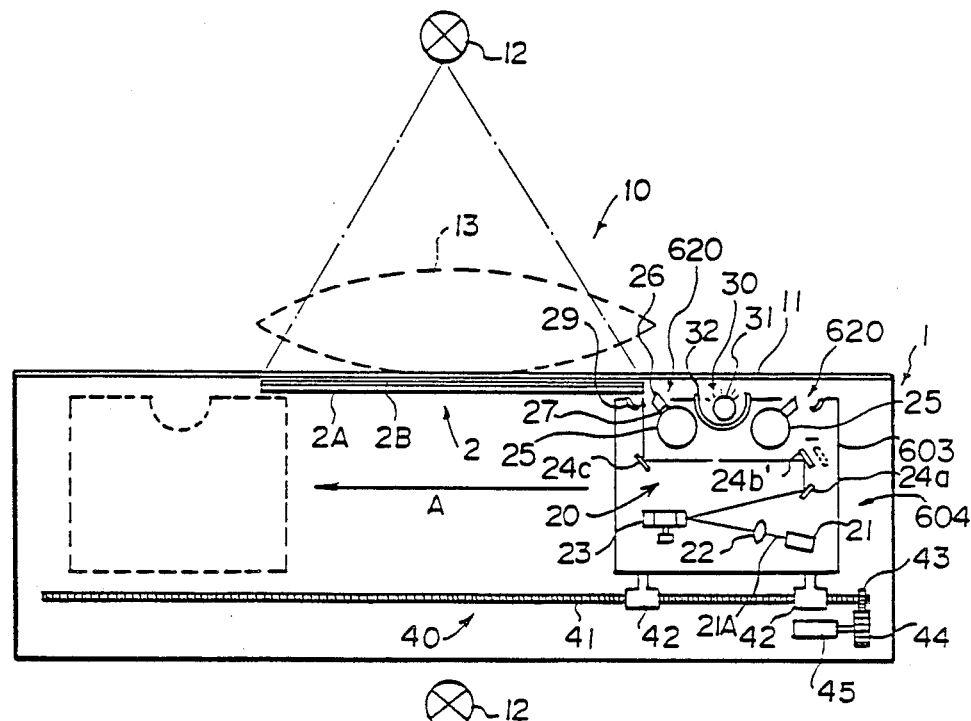
F I G. 20B
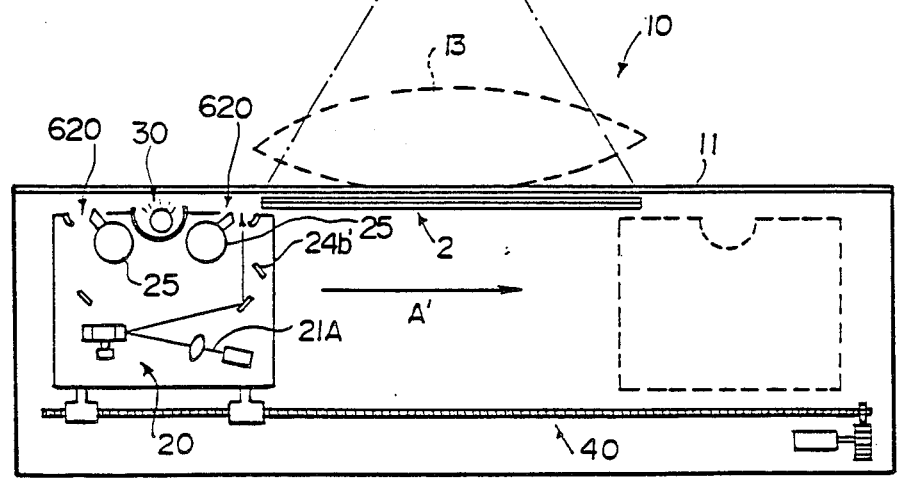

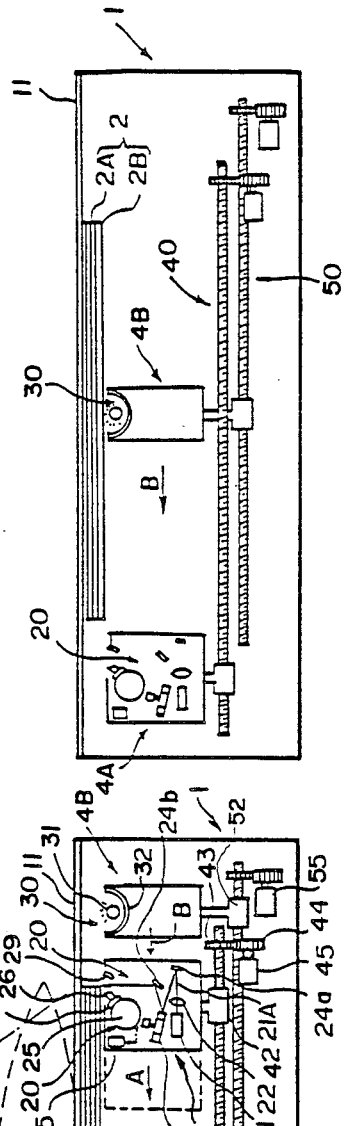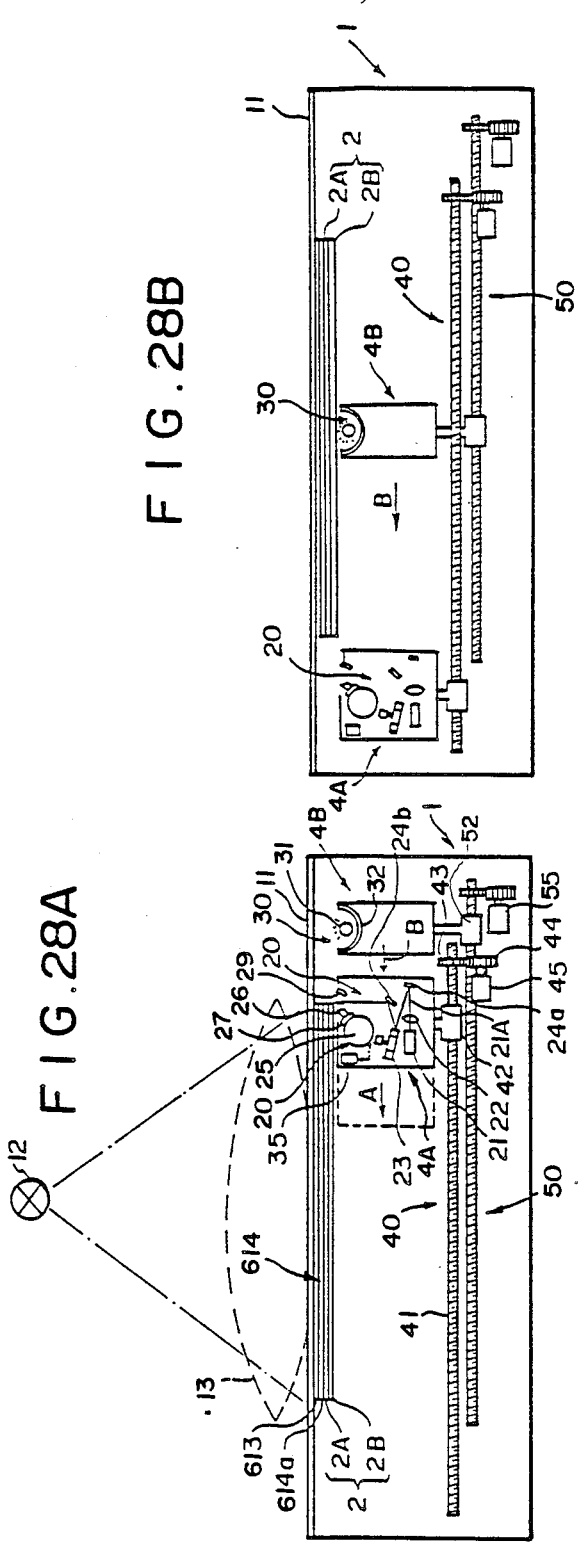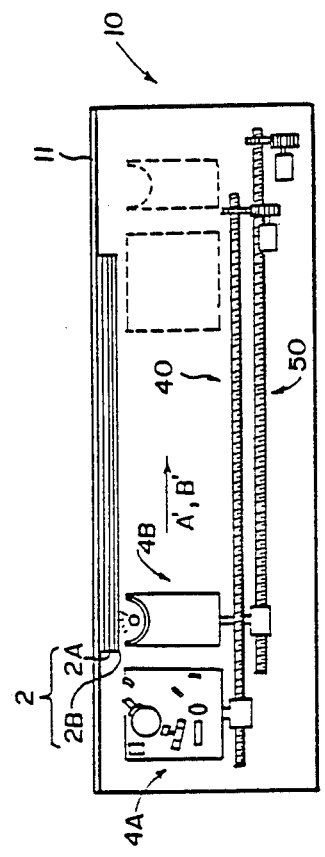

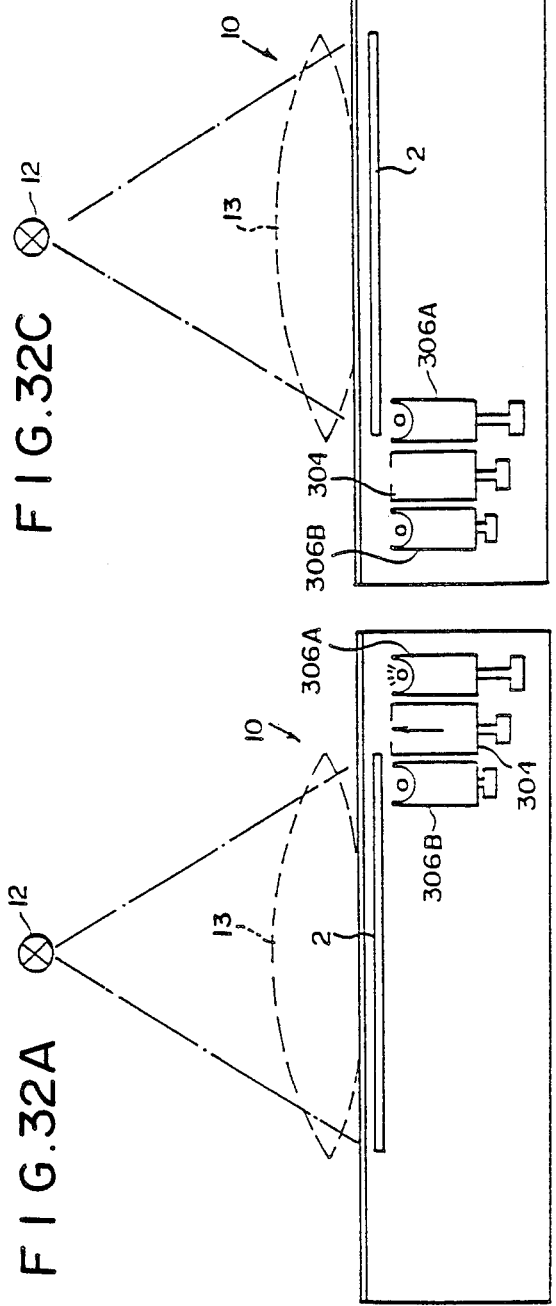
FIG. 32C
FIG. 32A
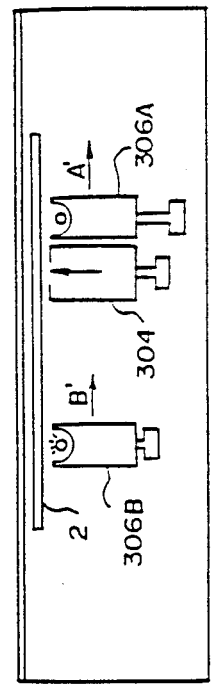
FIG. 32D
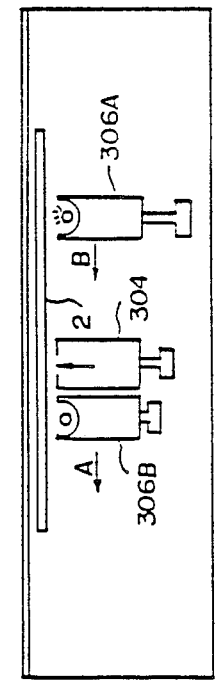
FIG. 32B

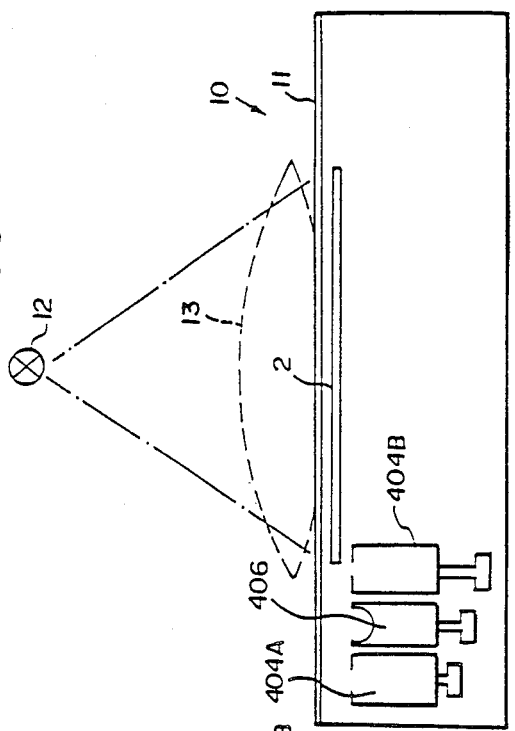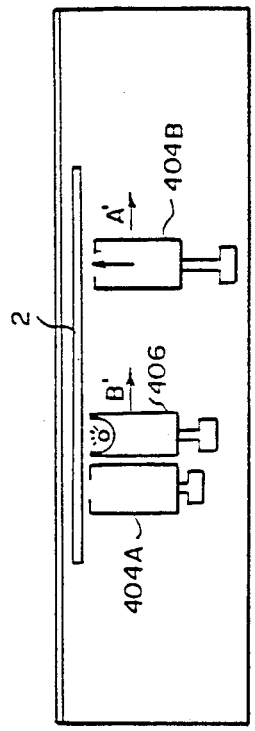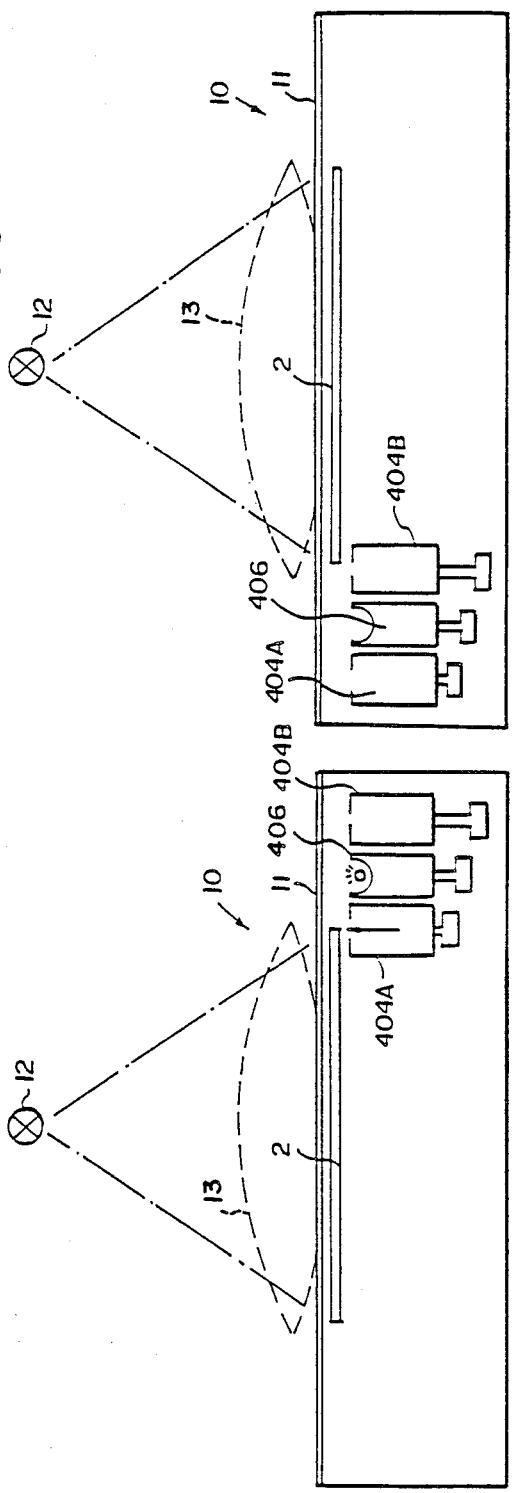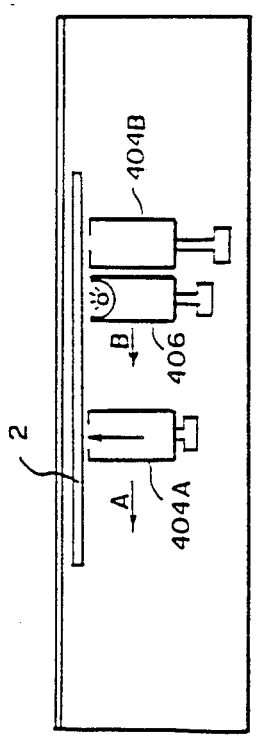

RADIATION IMAGE RECORDING AND READ-OUT APPARATUS

BACKGROUND OF THE INVENTION

1. Field of the Invention

This invention relates to a radiation image recording and read-out apparatus for recording a radiation image on a stimulable phosphor sheet, exposing the stimulable phosphor sheet to stimulating rays which cause the stimulable phosphor sheet to emit light in proportion to the stored radiation energy, detecting the emitted light to read out the radiation image, and converting the emitted light into electric signals. This invention particularly relates to a radiation image recording and read-out apparatus which is small as a whole.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter refferred to as a stimulable phosphor sheet) is first exposed to a radiation passing through an object such as the human body to have a radiation image of the object stored thereon, and is then two dimensionally scanned by stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals by a photodetector, and the radiation image of the object is reproduced as a visible image by us of the image signals on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into electric signals to reproduce a visible image on a recording medium or a display device.

In the aforesaid radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Accordingly, the applicant proposed in, for example, Japanese Unexamined Patent Publication No. 58(1983)-200269, a radiation image recording and read-out apparatus which enables efficient circulation and reuse of the stimulable phosphor.

The proposed radiation image recording and read-out apparatus comprises, built in a single apparatus:

(a) a supporting material, (b) at least one recording material fixed on said supporting material and comprised of a stimulable phosphor layer capable of storing a radiation image, (c) an image recording section for exposing said recording material to a radiation passing through an object to have a radiation image of the object stored on said recording material, (d) an image read-out section provided with a stimulating ray source for emitting stimulating rays for scanning said recording material carrying said radiation image stored thereon, and a photoelectric read-out means for obtaining electric image signals by reading out light emitted by said recording material scanned and stimulated with the stimulating rays, (e) a means for circulating said recording material on said supporting material with respect to said image read-out section for enabling reuse of said recording material by repeatedly moving said supporting material and said image read-out section with respect to each other, and (f) an erasing section for eliminating the radiation energy remaining on said recording material prior to image recording on said recording material after the radiation image is read out therefrom at said image read-out section, whereby the recording material is efficiently circulated and reused.

The aforesaid radiation image recording and read-out apparatus is used very advantageously mainly for medical diagnosis, and it is increasingly desired in recent years to make the overall apparatus as small as possible. Specifically, in the case where the recording and read-out apparatus is large, the apparatus can be installed only at the center of a comparatively large-scale hospital. On the other hand, when the apparatus is made small, it can be installed in, for example, each medical examination room of a comparatively small-scale hospital, and thus the range of utilization of the apparatus can be expanded. However, the conventional radiation image recording and read-out apparatuses wherein the stimulable phosphor sheet is circulated and reused in the manner as mentioned above have not necessarily been proposed for making the overall apparatus small to such a high level. Thus some conventional radiation image recording and read-out apparatuses are still large as a whole and cannot satisfy the aforesaid need, and others require a circulation and movement means for the stimulable phosphor sheet and a movement means for sub-scanning in the course of image read-out and thus has the drawback that the internal movement mechanism becomes complicated as a whole.

SUMMARY OF THE INVENTION

The primary object of the present invention is to provide a radiation image recording and read-out apparatus wherein the overall apparatus is efficiently made small, and the internal mechanism is simplified.

Another object of the present invention is to provide a radiation image recording and read-out apparatus wherein the overall apparatus is made smaller than the conventional radiation image recording and read-out apparatus, and erasing efficiency is improved.

The specific object of the present invention is to provide a radiation image recording and read-out apparatus wherein the apparatus is made small by carrying out image read-out and erasing by moving a read-out and erasing unit with respect to a stimulable phosphor sheet, and the time taken for the image read-out and erasing on the stimulable phosphor sheet is shortened.

The present invention provides a first radiation image recording and read-out apparatus comprising:
(i) a stimulable phosphor sheet,
(ii) an image recording means for exposing said stimulable phosphor sheet to a radiation passing through an object, thereby to store a radiation image of said object on said stimulable phosphor sheet,
(iii) a read-out and erasing unit comprising, formed integrally with each other into a unit: (a) an image read-out means provided with a stimulating ray scanning means for scanning said stimulable phosphor sheet carrying said radiation image stored thereon by stimulating rays deflected by a light deflector, and a photoelectric read-out means for photoelectrically detecting light emitted by said stimulable phosphor sheet in proportion to the stored radiation energy at a position of scanning by said stimulating rays, thereby to read out said radiation image, and (b) an erasing means for carrying out erasing by releasing radiation energy remaining on said stimulable phosphor sheet on which the image read-out has been finished, and
(iv) a unit movement means for reciprocally moving said read-out and erasing unit in a direction approximately normal to the direction of scanning of said stimulating rays, wherein said stimulable phosphor sheet is held at an image recording position facing said image recording means, said read-out and erasing unit is reciprocally moved to face said stimulable phosphor sheet held at said image recording position, carries out the image read-out by said image read-out means in the course of forward movement, and carries out the erasing by said erasing means in the course of backward movement.

As the photoelectric read-out means in the read-out and erasing unit, a long photomultiplier as will be described later or a read-out means comprising a combination of a fluorescent light guide member with a small photodetector should preferably be used for making the read-out and erasing unit more compact and making the overall apparatus smaller.

The present invention also provides a second radiation image recording and read-out apparatus comprising:
(i) a stimulable phosphor sheet,
(ii) an image recording means for exposing said stimulable phosphor sheet to a radiation passing through an object, thereby to store a radiation image of said object on said stimulable phosphor sheet,
(iii) a read-out and erasing unit comprising, formed integrally with each other into a unit: (a) an image read-out means provided with a stimulating ray irradiation means for linearly irradiating stimulating ray to said stimulable phosphor sheet carrying said radiation image stored thereon, and a line sensor disposed along a position of exposure to said stimulating rays for photoelectrically detecting light emitted by said stimulable phosphor sheet in proportion to the stored radiation energy at said position of exposure to said stimulating rays, thereby to read out said radiation image, and (b) an erasing means for carrying out erasing by releasing radiation energy remaining on said stimulable phosphor sheet on which the image read-out has been finished, and
(iv) a unit movement means for reciprocally moving said read-out and erasing unit in a direction approximately normal to the length direction of irradiation of said stimulating rays, wherein said stimulable phosphor sheet is held at an image recording position facing said image recording means, said read-out and erasing unit is reciprocally moved to face said stimulable phosphor sheet held at said image recording position, carries out the image read-out by said image read-out means in the course of forward movement, and carries out the erasing by said erasing means in the course of backward movement.

As the stimulating ray irradiation means in the read-out and erasing unit, a means composed of a light source and a fluorescent light guide member, which is fabricated by forming a sheet material containing a phosphor and disposed so that its surface receives light produced by the light source and an end face stands facing the stimulable phosphor sheet should preferably be used. In this case, the kind and the shape of the light source can be selected more freely, and the efficiency of utilization of stimulating rays for stimulating the stimulable phosphor sheet becomes high The present invention further provides a third radiation image recording and read-out apparatus comprising:
(i) a stimulable phosphor sheet,
(ii) an image recording means for exposing said stimulable phosphor sheet to a radiation passing through an object, thereby to store a radiation image of said object on said stimulable phosphor sheet,
(iii) a read-out and erasing unit comprising, formed integrally with each other into a unit: (a) an image read-out means provided with a stimulating ray irradiation means for irradiating stimulating rays in a predetermined direction to said stimulable phosphor sheet carrying said radiation image stored thereon, and a photoelectric read-out means for photoelectrically detecting light emitted by said stimulable phosphor sheet in proportion to the stored radiation energy upon exposure to said stimulating rays and generating image signals, and (b) two erasing means disposed on either side of said image read-out means in a direction normal to the direction of irradiation of said stimulating rays for carrying out erasing by releasing radiation energy remaining on said stimulable phosphor sheet on which the image read-out has been finished, a light shielding means being provided between said image read-out means and said erasing means, and
(iv) a unit movement means for reciprocally moving said read-out and erasing unit in a direction approximately normal to the length direction of irradiation of said stimulating rays, wherein said stimulable phosphor sheet is held at an image recording position facing said image recording means, said read-out and erasing unit is reciprocally moved to face said stimulable phosphor sheet held at said image recording position, carries out the image read-out by said image read-out means and the erasing by one of said two erasing means that is positioned on the upstream side of said image read-out means, as viewed in the direction of forward movement, in the course of forward movement, and carries out the image read-out by said image read-out means and the erasing by the other of said two erasing means that is positioned on the upstream side of said image read-out means, as viewed in the direction of backward movement, in the course of backward movement.

In the third radiation image recording and read-out apparatus in accordance with the present invention, the image read-out means should preferably be as compact as possible from the viewpoint of making the overall apparatus small. For example, as the photoelectric read-out means, a long photomultiplier as will be described later or the like is suitable. Also, irradiation of stimulating rays is not limited to the scanning with stimulating rays as mentioned above, and it is possible to employ a system wherein stimulating rays are irradiated linearly and the light emitted by the image-recorded stimulable phosphor sheet in proportion to the stored radiation energy at the position of irradiation of stimulating rays is detected by a line sensor. The system is particularly advantageous from the viewpoint of making the image read-out means small.

With the first radiation image recording and read-out apparatus in accordance with the present invention wherein the stimulable phosphor sheet is held at the image recording position and the image read-out and the erasing are carried out by reciprocally moving the read-out and erasing unit, which comprises the image read-out means and the erasing means formed integrally with each other into a unit, with respect to the stimulable phosphor sheet, the length of the apparatus in the direction of movement of the read-out and erasing unit can be decreased to a value nearly equal to the length of a single stimulable phosphor sheet, and the apparatus as a whole can be made compact. Also, sub-scanning with stimulating rays in the course of the image read-out and irradiation of erasing light to the overall surface of the stimulable phosphor sheet can be alternately carried out by merely reciprocating the read-out and erasing unit, and therefore the movement means in the apparatus can be simplified. Further, the erasing means irradiates the erasing light to the overall surface of the stimulable phosphor sheet while the erasing means is being moved facing the stimulable phosphor sheet, and therefore the erasing means may be smaller than the case where the erasing light is irradiated to the overall surface of the stimulable phosphor sheet at one time.

With the second radiation image recording and read-out apparatus in accordance with the present invention wherein the stimulable phosphor sheet is held at the image recording position, the image read-out and the erasing are carried out by reciprocally moving the read-out and erasing unit, which comprises the image read-out means and the erasing means formed integrally with each other into a unit, with respect to the stimulable phosphor sheet, and the erasing is carried out by the movement of the erasing means with respect to the stimulable phosphor sheet, the erasing means may be smaller than the case where the erasing light is irradiated to the overall surface of the stimulable phosphor sheet at one time, and the overall apparatus can be made small. Also, the erasing means can be disposed close to the stimulable phosphor sheet, the erasing efficiency can be improved.

Also, with the second radiation image recording and read-out apparatus in accordance with the present invention wherein the line sensor is used as the photoelectric read-out means in the image read-out means, division in accordance with picture elements can be carried out on the side of the photoelectric read-out means. Therefore, a light deflector for stimulating rays, a device for guiding the light emitted by the stimulable phosphor sheet and the like become unnecessary, and the image read-out means becomes more compact than the conventional image read-out means. Accordingly, the apparatus can be made more compact.

With the third radiation image recording and read-out apparatus in accordance with the present invention wherein the stimulable phosphor sheet is held at the image recording position, the image read-out and the erasing are carried out by reciprocally moving the read-out and erasing unit with respect to the stimulable phosphor sheet, the erasing means can be small, and the overall apparatus can be made compact. Also, the two erasing means are disposed on either side of the image read-out means, and therefore both the image read-out and the erasing can be carried out in each of forward movement and backward movement of the read-out and erasing unit. Accordingly, the speed of the image read-out and erasing on the stimulable phosphor sheet can be increased to approximately two times the speed in the case where a single erasing means is provided.

Accordingly, the first, second and third radiation image recording and read-out apparatuses in accordance with the present invention can readily be installed in small scale medical facilities where the conventional recording and read-out apparatus of this type could not easily be installed, and thus the range of utilization of the apparatus can be expanded.

BRIEF DESCRIPTION OF THE DRAWINGS

FIG. 2A is a perspective view showing the venetian blind type photomultiplier, FIG. 2B is a sectional view taken along line I—I of FIG. 2A, FIG. 4 is a side view showing another embodiment of the first radiation image recording and read-out apparatus in accordance with the present invention FIGS. 5A and 5B are a perspective view and a sectional view showing the photoelectric read-out means using a fluorescent light guide member, FIGS. 15A and 15B are side views showing an embodiment of the third radiation image recording and read-out apparatus in accordance with the present invention, FIGS. 20A and 20B are side views showing an embodiment of the fourth radiation image recording and read-out apparatus in accordance with the present invention, FIGS. 28A, 28B and 28C are side views showing an embodiment of the sixth radiation image recording and read-out apparatus in accordance with the present invention.

DESCRIPTION OF THE PREFERRED EMBODIMENTS

The present invention will hereinbelow be described in further detail with reference to the accompanying drawings.

Figure 1A:
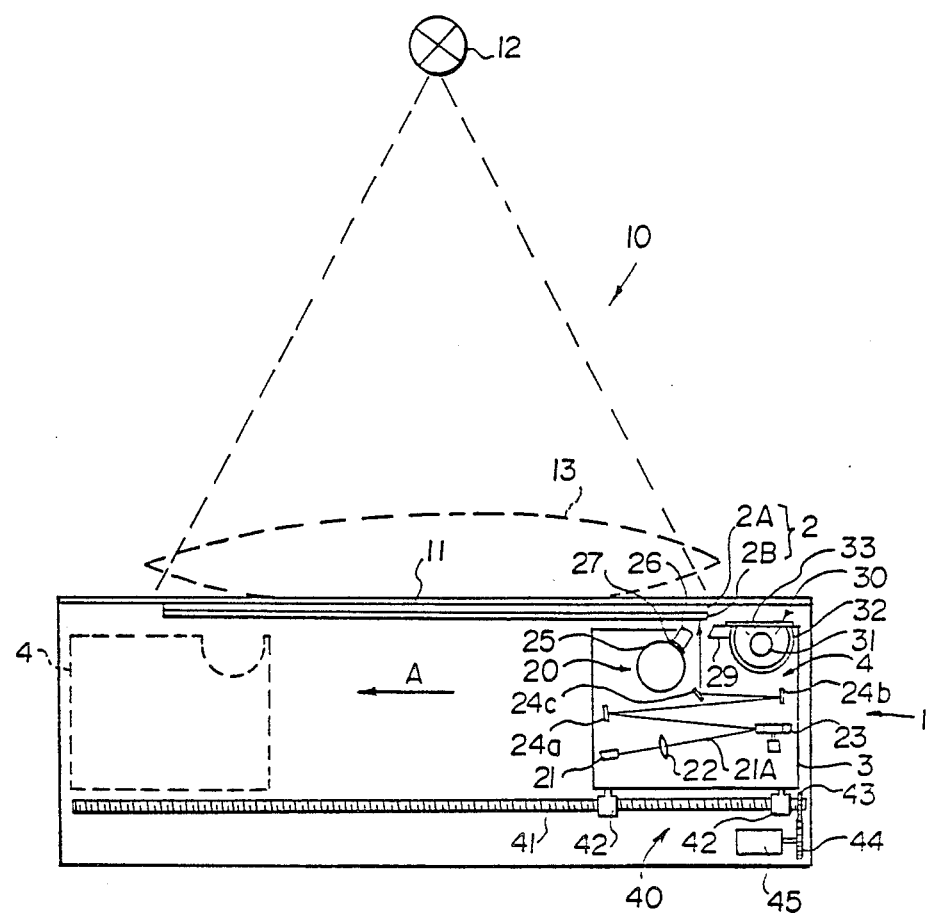
FIGS. 1A and 1B are side views showing an embodiment of the first radiation image recording and read-out apparatus in accordance with the present invention.
Figure 1B:
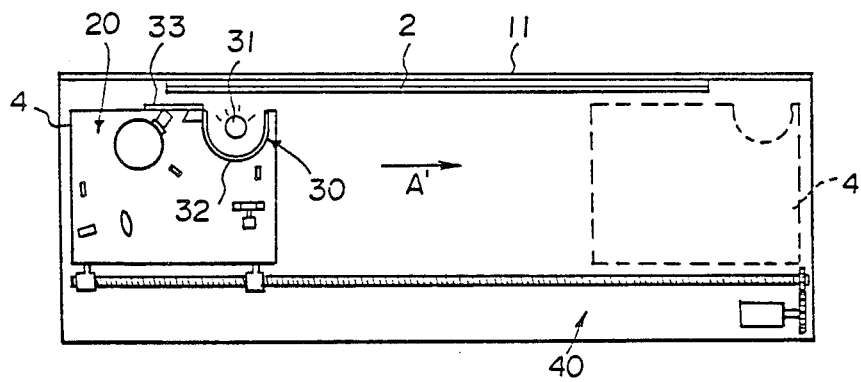

With reference to FIGS. 1A and 1B, an embodiment of the first radiation image recording and read-out apparatus in accordance with the present invention comprises an apparatus body 1, and a radiation source 12 constituted by an X-ray source or the like and disposed above an image recording table 11 constituting an upper surface of the apparatus body 1. In the apparatus body 1, a stimulable phosphor sheet 2 is secured to and held on the lower surface of the image recording table 11. The stimulable phosphor sheet 2 comprises a radiation-permeable substrate 2A and a stimulable phosphor layer 2B overlaid on the substrate 2A. The image recording table 11 is also permeable to radiation. The stimulable phosphor sheet 2 may be constituted by the stimulable phosphor layer overlaid directly on the lower surface of the image recording table 11. In this embodiment, an image recording means 10 is constituted by the radiation source 12 and the image recording table 11.

A read-out and erasing unit 4 comprising a case 3, and an image read-out means and an erasing means 30 integrally housed close to each other in the case 3 to form a unit is provided below the stimulable phosphor sheet 2. The read-out and erasing unit 4 is reciprocally moveable while facing the stimulable phosphor sheet 2 between the right end position (first position) as indicated by the solid line in FIG. 1A and the left end position (second position) as indicated by the solid line in FIG. 1B. In this embodiment, movement in the direction as indicated by the arrow A from the first position to the second position is referred to as forward movement, and movement in the direction as indicated by the arrow A' from the second position to the first position is referred to as backward movement (this also applies to the other embodiments). Also, by way of example, a unit movement means 40 for reciprocally moving the read-out and erasing unit 4 is composed of a screw rod 41 extending in the direction of movement of the read-out and erasing unit 4, unit supporting members 42, 42 engaged with the screw rod 41, a gear 43 secured to the screw rod 41, a gear 44 meshing with the gear 43, and a motor 45 for rotating the gear 44 in the normal and reverse directions. The screw rod 41 is rotated by the motor 45 via the gears 43 and 44, thereby to move the unit supporting members 42, 42 and carry out reciprocal movement of the read-out and erasing unit 4.

After an object 13 is placed on the image recording table 11 of the image recording means 10, the radiation source 12 is activated to produce radiation, an image of the radiation passing through the object 13 is projected onto the stimulable phosphor sheet 2, and the radiation image of the object 13 is stored on the stimulable phosphor layer 2B of the stimulable phosphor sheet 2. When the image recording is thus finished, the radiation image stored on the stimulable phosphor sheet 2 is read out by the image read-out means 20 in the read-out and erasing unit 4.

The image read-out means 20 is provided with a stimulating ray scanning means which comprises a stimulating ray source 21 constituted by a semiconductor laser or the like, a condensing lens 22 disposed in the optical path of stimulating rays 21A produced by the stimulating ray source 21, a rotating polygon mirror 23 as a light deflector for deflecting the stimulating rays 21A passing through the condensing lens 22 at an angle normal to the drawing sheet in FIG. 1A, thereby to scan the stimulating rays 21A in a main scanning direction on the stimulable phosphor sheet 2, and mirrors 24a, 24b and 24c for changing the optical path of the stimulating rays 21A. The stimulating rays 21A is made by the stimulating ray scanning means to repeatedly scan the stimulable phosphor sheet 2 in the main scanning direction. On the other hand, simultaneously with the scanning of the stimulating rays 21A in the main scanning direction, the read-out and erasing unit 4 is conveyed by the unit movement means 40 at a predetermined speed in the direction as indicated by the arrow A. As a result, the scanning position of the stimulating rays 21A is moved in the direction as indicated by the arrow A, i.e. in the sub-scanning direction, and almost the overall surface of the stimulable phosphor sheet 2 is exposed to the stimulating rays 21A. As the stimulable phosphor sheet 2 is exposed to the stimulating rays 21A, the exposed portion of the sheet 2 emits light in proportion to the stored radiation energy, and the emitted light is detected by a photoelectric read-out means of the image read-out means 20.

In this embodiment, the photoelectric read-out means comprises a long photomultiplier 25 extending in the main scanning direction at least over the length of the main scanning line, a filter 27 closely contacted with the light receiving face of the photomultiplier 25 for selectively transmitting only the light emitted by the stimulable phosphor sheet 2 and preventing entry of the stimulating rays 21A reflected by the surface of the stimulable phosphor sheet 2 to the photomultiplier 25, and a light guide member 26 closely contacted with the light input face of the photomultiplier 25 via the filter 27 for substantially guiding the light emitted by the stimulable phosphor sheet 2 to the photomuliplier 25. By way of example, as shown in FIGS. 2A and 2B, the photomultiplier 25 has an electrode configuration generally called the venetian blind type. Also, a mirror 29 is disposed to face the photoelectric read-out means via the scanning line for efficiently reflecting the light, which is emitted by the stimulable phosphor sheet 2 toward the mirror 29, to the light receiving face of the light guide member 26. With reference to FIGS. 2A and 2B, the photomultiplier 25 comprises a cylindrical body 28A, a photocathode 25b disposed along the inner surface of the body 25A to face a light receiving face 25a, and a multiplying section 25f disposed under the photocathode 25b and including a plurality of dynodes 25c which are stacked via insulating members 25d, 25d secured by pins 25e, 25e. The dynodes 25c are respectively constituted by a conductive plate provided with a plurality of sections cut in a U-shape and bent to form a blind-like shape. A shield electrode 25g is secured by the pins 25e, 25e under the multiplying section 25f via the insulating members 25d, 25d, and an anode 25h is disposed inside of the shield electrode 25g. These electrodes are electrically connected in one-to-one relation with terminals of a terminal group 25i disposed at the side end of the body 25A.

Figure 3:
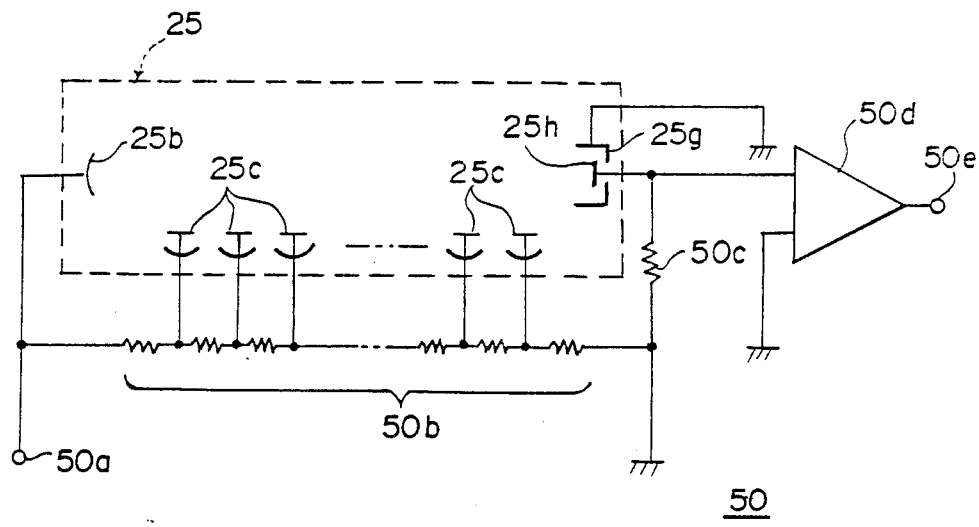
FIG. 3 is a circuit diagram showing the drive circuit for the photomultiplier shown in FIG. 2A.

FIG. 3 shows an electric circuit 50 for operating the photomultiplier 25 and obtaining a photoelectric output. In FIG. 3, similar elements are numbered with the same reference numerals with respect to FIG. 2A. A high negative voltage is applied to the photocathode 25b via a high negative voltage applying terminal 50a. The high negative voltage applied to the high negative voltage applying terminal 50a is divided by a bleeder resistance group 50b into voltages which are applied respectively to the dynodes 25c. The shield electrode 25g is grounded, and the anode 25h is grounded via a resistor 50c and is connected with one of terminals of an amplifier 50d. The other terminal of the amplifier 50d is grounded. The photoelectrically converted image information is obtained as electric signals from an output terminal 50e of the amplifier 50d. The shield electrode 25g need not necessarily be provided. The electric signals thus obtained are subjected to necessary image processing, and then sent to a display device such as a CRT or an image reproducing apparatus for carrying out light beam scanning recording on a photosensitive film. At the time the image read-out is finished, the read-out and erasing unit 4 has been moved to its second position as indicated by the broken line in FIG. 1A.

When the image read-out has been finished in the manner as mentioned above, as shown in FIG. 1B, the read-out and erasing unit 4 is conveyed in the direction as indicated by the arrow A' from its second position to its first position, and the overall surface of the stimulable phosphor sheet 2 is exposed to the erasing light produced by the erasing means 30 in the read-out and erasing unit 4 conveyed in the direction as indicated by the arrow A'. By way of example, the erasing means 30 is provided with an erasing light source 31 constituted by a fluorescent lamp or the like and extending in the main scanning direction, and a reflection plate 32 for reflecting the erasing light, that is radiated downward by the erasing light source 31, toward the surface of the stimulable phosphor sheet 2. Also, in this embodiment, the erasing light source 31 is always turned on. Therefore, a moveable shutter 33 is provided so that it is disposed above the erasing light source 31 as shown in FIG. 1A to shield the erasing light at the time the image recording and the image read-out are carried out, and is retracted to the position above the photomultiplier 25 as shown in FIG. 1B to lay bare the erasing light source 31 only when the erasing is to be carried out. The moveable shutter 33 need not necessarily be provided in the case where the erasing light source 31 is turned on only when the erasing is to be carried out, and is turned off in the steps other than the erasing. As the read-out and erasing unit 4 is moved in the direction as indicated by the arrow A', the erasing light source 31 irradiates the erasing light to the overall surface of the stimulable phosphor sheet 2. The erasing light source 31 mainly produces light having a wavelength within the stimulation wavelength range of the stimulable phosphor sheet 2, and radiation energy remaining on the sheet 2 after the image read-out therefrom is carried out is released from the sheet 2 when the sheet 2 is exposed to the erasing light. The stimulable phosphor sheet 2 thus erased can be reused for image recording with the image recording means 10, and the read-out and erasing unit 4 is returned to its first position.

With this embodiment wherein the stimulable phosphor sheet 2 is secured and held to face the image recording means 10, the image read-out means and the erasing means are formed integrally with each other as the read-out and erasing unit 4, and the read-out and erasing unit 4 is reciprocated for carrying out the image read-out and the erasing, the width of the apparatus can be reduced to a value nearly equal to the length of a single stimulable phosphor sheet. Particularly, with the aforesaid embodiment wherein the long photomultiplier 25 is utilized as the photoelectric read-out means, the read-out and erasing unit 4 and the overall apparatus can be made smaller. Also, since the optical path of the stimulating rays 21A is positioned below the photoelectric read-out means and the erasing means, the width of the read-out and erasing unit 4 itself can be made very small. Further, change-over between the image read-out and the erasing, and sub-scanning are completed by merely reciprocating the read-out and erasing unit 4, the movement mechanism of the overall apparatus can be simplified.

The long photomultiplier of the photoelectric read-out means is not limited to the aforesaid venetian blind type, and may also be fabricated by extending a photomultiplier provided with a multiplying section comprising other known electrode or electrodes, such as a box type photomultiplier. Also, the configurations of the respective means in the apparatus are not limited to those in the aforesaid embodiment. Another embodiment of the first radiation image recording and read-out apparatus in accordance with the present invention will hereinbelow be described with reference to FIG. 4. In FIG. 4, similar elements are numbered with the same reference numerals with respect to FIG. 1A.

In the embodiment shown in FIG. 4, the image read-out and the erasing are carried out from the same side as the surface of the stimulable phosphor sheet 2 to which the radiation is irradiated. Therefore, the stimulable phosphor sheet 2 is secured and held by a sheet holding means (not shown) so that a substrate 2A" of the sheet 2 faces down and the stimulable phosphor layer 2B faces up. In this case, the substrate 2A" need not be permeable to radiation. Also, the read-out and erasing unit 4 is reciprocally moved in the direction as indicated by the arrow between the stimulable phosphor sheet 2 and the image recording table 11. Though the unit movement means for moving the read-out and erasing unit 4 is not shown, the length of the read-out and erasing unit 4 in the direction normal to the drawing sheet in FIG. 4 may be adjusted to be, for example, slightly longer than the width of the stimulable phosphor sheet 2, and the same movement means as in the embodiment shown in FIG. 1 may be associated with the edge portion of the read-out and erasing unit 4. The optical path of the stimulating rays 21A in the read-out and erasing unit 4 is formed mainly in the horizontal relation to a photoelectric read-out means 120 and the erasing means 30. This configuration of the optical path of the stimulating rays 21A is advantageous for decreasing the height of the apparatus body, though the length thereof in the horizontal direction becomes slightly long.

In the embodiment shown in FIG. 4, a combination of a fluorescent light guide member 126 fabricated by forming a sheet material containing a phosphor with photodetectors 125, 125 is used as the photoelectric read-out means. FIGS. 5A and 5B are a perspective view and a sectional view showing the configuration of the photoelectric read-out means.

With reference to FIGS. 5A and 5B, when light is irradiated to the surface of the fluorescent light guide member 126, the phosphor contained in the fluorescent light guide member is stimulated by the light to radiate fluorescence 127. The fluorescence 127 advances to the end faces by repeating total reflection inside of the fluorescent light guide member 126. Therefore, the fluorescence having a high intensity is radiated from the end faces of the fluorescent light guide member 126 in such a form that energy of the light emitted by the stimulable phosphor sheet 2 is condensed. The optical amount of the fluorescence 127 thus radiated is proportional to the optical amount of the light emitted by the stimulable phosphor sheet 2, and therefore the optical amount of the light emitted by the stimulable phosphor sheet 2 can be detected indirectly by closely contacting photodetectors 125, 125 with the end faces of the fluorescent light guide member 126 and detecting the optical amount of the fluorescence 127. Also, the light receiving surfaces of the photodetectors 125, 125 may be small, and therefore read-out image signals can be obtained in a high signal-to-noise ratio. Accordingly, in this embodiment, the fluorescent light guide member 126 is formed in an approximately semicylindrical shape, and a slit 126a through which the stimulating rays 21A are to be passed is formed at the upper part of the fluorescent light guide member 126. The fluorescent light guide member 126 extends in the main scanning direction so that the slit 126a is disposed along and above the main scanning position of the stimulating rays 21A. In this manner, the stimulable phosphor sheet 2 is scanned by the stimulating rays 21A passing through the slit 126a, and the light emitted by the stimulable phosphor sheet 2 is received by an inner surface 126e of the fluorescent light guide member 126. By way of example, the fluorescent light guide member 126 in this embodiment is selected so that it radiates fluorescence mainly having a wavelength of 500 nm upon receiving the light mainly having a wavelength of approximately 400 nm emitted by the stimulable phosphor sheet 2. As such a fluorescent light guide member, a product comprising a sheet-shaped plastic material and an organic phosphor dispersed therein is supplied by Bayer Japan under the trade name LISA-PLASTIC. Also, the photodetectors 125, 125 are closely contacted with either end face of the fluorescent light guide member 126 for detecting the fluorescence. The outputs of the photodetectors 125, 125 are added together and sent to a read-out circuit. By way of example, the photodetectors 125, 125 are constituted by CCD type solid state semiconductor devices. In general, the spectral sensitivity characteristics of the photodetectors 125, 125 constituted by CCD type solid state semiconductor devices deteriorate on the short wavelength side. However, with the fluorescent light guide member 126, the light mainly having a wavelength of approximately 400 nm emitted by the stimulable phosphor sheet 2 is wavelength-converted to the fluorescence mainly having a wavelength of 500 nm, and therefore the light emitted by the stimulable phosphor sheet 2 can be detected at a high sensitivity by the photodetectors 125, 125. A filter for transmitting the fluorescence radiated by the fluorescent light guide member 126 and intercepting the stimulating rays 21A reflected by the stimulable phosphor sheet 2 should preferably be provided between each end face of the fluorescent light guide member 126 and each photodetector 125. The phosphor contained in the fluorescent light guide member 126 may be, for example, an organic phosphor such as a coumarin derivative, a thioxanthene derivative, a perylene derivative, or a phorone complex as disclosed in Japanese Unexamined Patent Publication No. 56(1981)-36549, 56(1981)104987, 58(1983)-111886 or 59(1984)-89302.

Figure 6A:
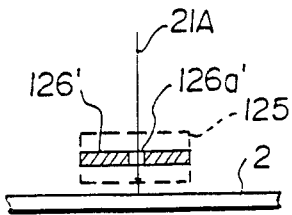
FIGS. 6A and 6B are schematic views showing further examples of the fluorescent light guide member.
Figure 6B:
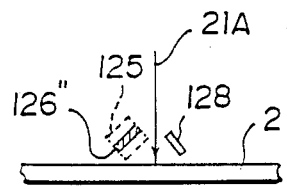

The shape and the layout of the fluorescent light guide member are not limited to those as in the aforesaid embodiment, and any shape and any layout may be employed insofar as the surface of the fluorescent light guide member extends along the main scanning line and the light emitted by the scanning position can be detected. For example, as shown in FIG. 6A, an elongated rectangular fluorescent light guide member 126' having a slit 126a' extending in the main scanning direction may be disposed to face the scanning line. Alternatively, as shown in FIG. 6B, a rectangular fluorescent light guide member 126" may be disposed at an oblique angle, and a mirror 128 may be disposed to reflect the light, which is emitted by the scanning position toward the mirror 128, toward the fluorescent light guide member 126". Also, the two photodetectors need not necessarily be provided on either end face of the fluorescent light guide member, and a single photodetector may be provided on one end face of the fluorescent light guide member. In this case, a reflection member such as a deposition film formed of aluminium or the like, a metal surface or a white paint layer may be provided on the other end face on which no photodetector is provided. As the photodetector, a photoconductor type photodetector, a PIN photodiode, a known small photomultiplier or the like may also be employed. In the case where a picture element division type sensor such as a SIT-, CCD- or MOS-type solid state semiconductor device is employed, signal processing such as integration is carried out.

Figure 7A:
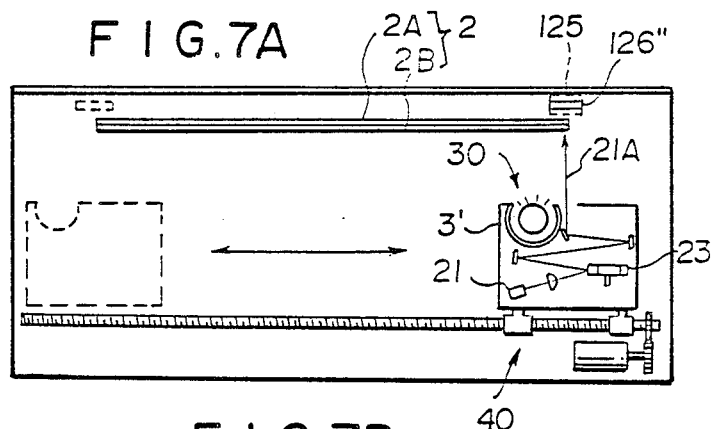
FIGS. 7A and 7B are a side view and a front view showing a further embodiment of the first radiation image recording and read-out apparatus in accordance with the present invention.
Figure 7B:
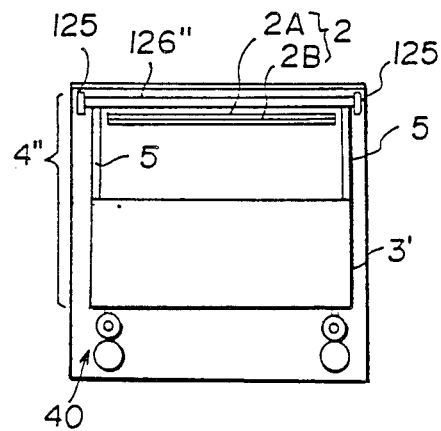

In the embodiments shown in FIGS. 1A and 4, the long photomultiplier is used in the case where the image read-out is carried out on the side opposite to the surface of the stimulable phosphor sheet to which the radiation is irradiated, and the fluorescent light guide member and the photodetector are used in the case where the image read-out is carried out on the same side as the surface of the stimulable phosphor sheet to which the radiation is irradiated. However, the side on which the image read-out is carried out may be reversed in both cases where the two types of the photoelectric read-out means are used. Specifically, the read-out and erasing unit provided with the long photomultiplier as shown in FIG. 1 may be disposed between the image recording table and the stimulable phosphor sheet in the same manner as the read-out and erasing unit shown in FIG. 4, thereby to carry out the image read-out and the erasing on the same side as the surface of the stimulable phosphor sheet to which the radiation is irradiated. Also, the read-out and erasing unit provided with the fluorescent light guide member as shown in FIG. 4 may be disposed below the stimulable phosphor sheet in the same manner as the read-out and erasing unit shown in FIG. 1, thereby to carry out the image read-out and the erasing on the side opposite to the surface of the stimulable phosphor sheet to which the radiation is irradiated. Further, the read-out and erasing unit need not necessarily be provided on one side of the stimulable phosphor sheet, and some of the parts of the read-out and erasing unit may face one side of the stimulable phosphor sheet and the other parts of the read-out and erasing unit may face the other side of the stimulable phosphor sheet. For example, as shown in FIGS. 7A and 7B, the stimulating ray scanning means provided with the stimulating ray source 21 constituted by a semiconductor laser or the like, the rotating polygon mirror 23 and other parts, and the erasing means 30 may be disposed below the stimulable phosphor sheet composed of a transparent substrate 2A' and the stimulable phosphor layer 2B in a case 3', and the photoelectric read-out means composed of the fluorescent light guide member 126" and the photodetectors 125, 125 as mentioned above may be disposed above the stimulable phosphor sheet 2 to face the scanning position of the stimulating rays 21A via the stimulable phosphor sheet 2. The photoelectric read-out means is secured integrally to the case 3' by supporting means 5, 5 provided beside the stimulable phosphor sheet 2. In this embodiment, a read-out and erasing unit 4" is composed of the respective means in the case 3', the photoelectric read-out means, and the supporting means 5, 5. The stimulable phosphor sheet 2 is exposed to the stimulating rays 21A from the side opposite to the surface to which the radiation is irradiated, and is caused to emit light in proportion to the stored radiation energy. Of the emitted light, the light emitted upward of the stimulable phosphor sheet 2 is guided by the fluorescent light guide member 126" to the photodetectors 125, 125.

The photoelectric read-out means which comprises the long photomultiplier or the fluorescent light guide member and which is small by itself as in the aforesaid embodiments is advantageous for making the overall apparatus small. As the photoelectric read-out means, it is also possible to use a known means comprising a light guide member having a light input face extending along the main scanning line and a cylindrical light output face, and a comparatively small photomultiplier closely contacted with the light output face of the light guide member.

Figure 8A:
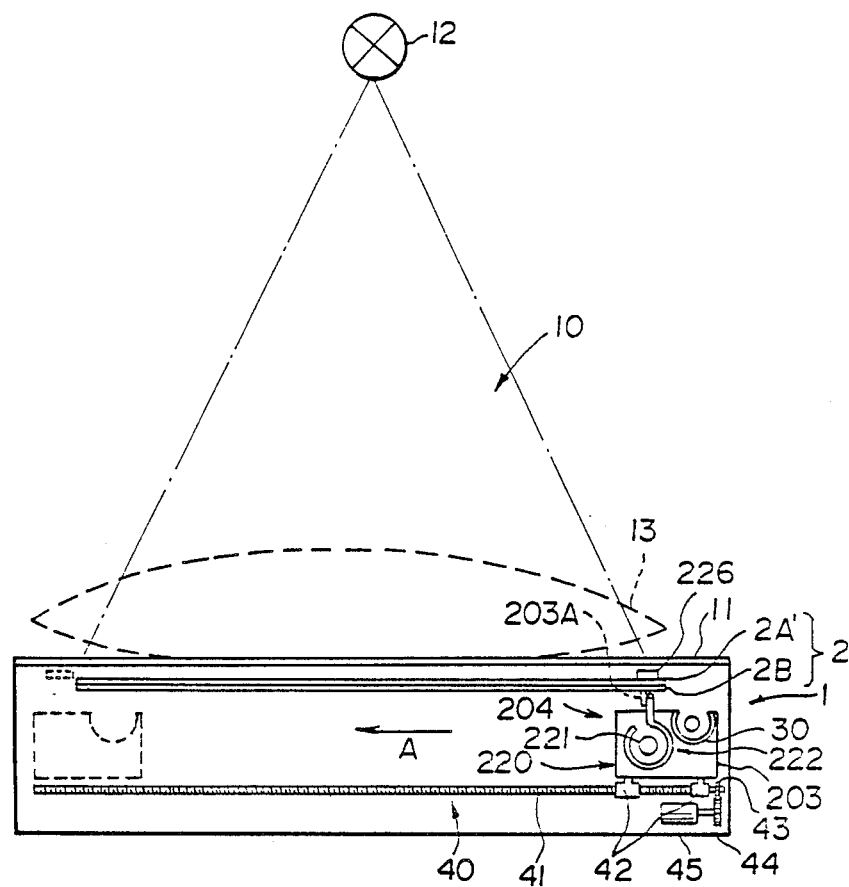
FIGS. 8A and 8B are side views showing an embodiment of the second radiation image recording and read-out apparatus in accordance with the present invention.
Figure 8B:
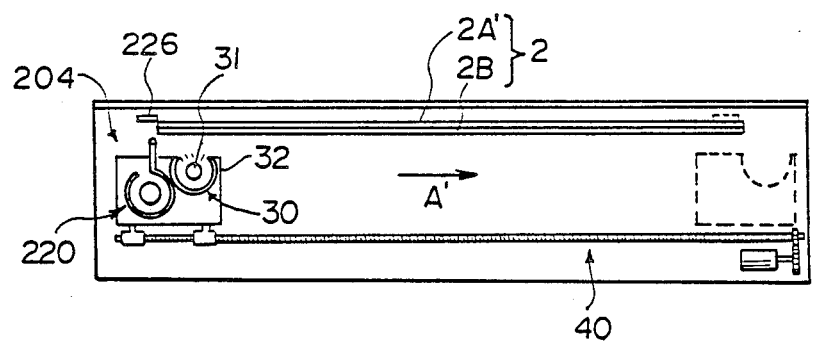

An embodiment of the second radiation image recording and read-out apparatus in accordance with the present invention will hereinbelow be described with reference to FIGS. 8A and 8B. In FIGS. 8A and 8B, similar elements are numbered with the same reference numerals with respect to FIGS. 1A and 1B.

With reference to FIGS. 8A and 8B, the stimulable phosphor sheet 2 is secured and held by a holding means (not shown) below the image recording table 11 in the apparatus body 1. The stimulable phosphor sheet 2 is composed of the transparent substrate 2A' and the stimulable phosphor layer 2B overlaid on the transparent substrate 2A'.

Figure 9:
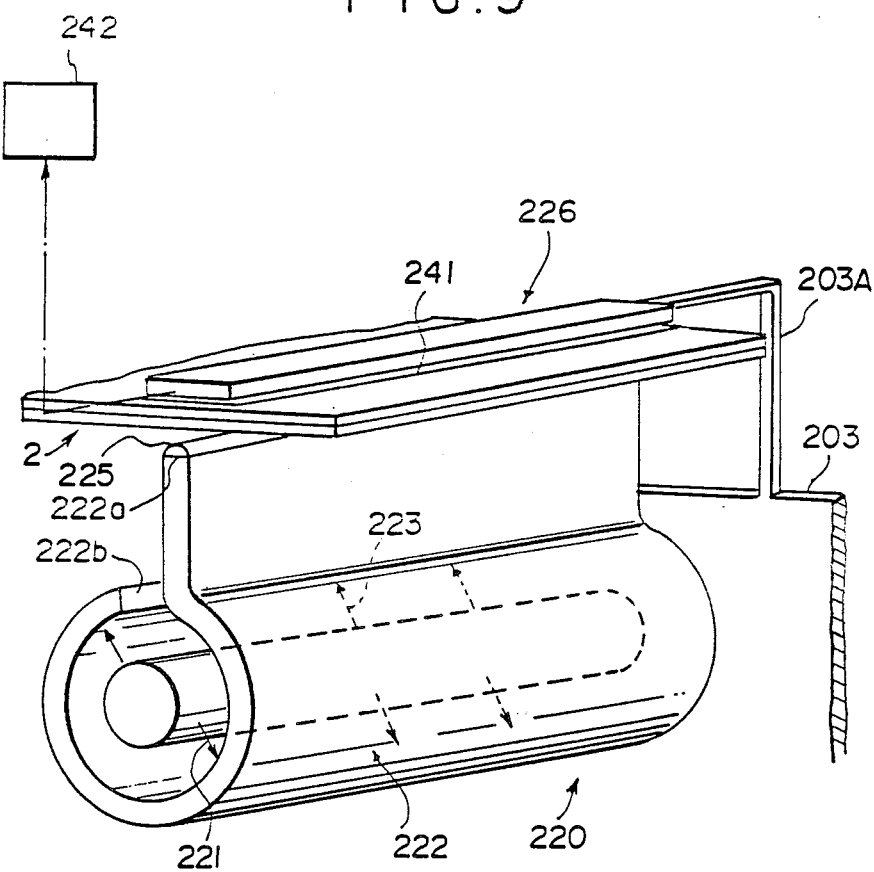
FIG. 9 is an enlarged perspective view showing the stimulating ray irradiation means and the line sensor in the embodiment shown in FIG. 8A, FIGS. 10 and 11 are a schematic front view and a schematic side view of the part shown in FIG. 9.

A stimulating ray irradiation means 220 and the erasing means 30 housed in a case 203 are disposed below the stimulable phosphor sheet 2, and a line sensor 226 connected integrally with the case 203 is disposed above and close to the stimulable phosphor sheet 2. In this embodiment, the image read-out means is constituted by the stimulating ray irradiation means 220 and the line sensor 226, and a read-out and erasing unit 204 is constituted by the stimulating ray irradiation means 220 and the erasing means 30 housed in the case 203, and the line sensor 226. The read-out and erasing unit 204 is reciprocally moved in the same manner as the read-out and erasing unit 4 in the embodiment shown in FIG. 1A. As shown in FIG. 9 which is an enlarged view showing the stimulating ray irradiation means 220 and the line sensor 226, the line sensor 226 is secured to the case 203 integrally therewith by a supporting means 203A provided beside the stimulating ray irradiation means 220, and is reciprocally moved by the unit movement means 40 integrally with the respective means in the case 203. The stimulating ray irradiation means 220 will now be described below with reference to FIG. 9.

The stimulating ray irradiation means 220 irradiates stimulating rays to the stimulable phosphor sheet 2 linearly in a direction normal to the direction of movement of the read-out and erasing unit 204. In this embodiment, the stimulating ray irradiation means 220 is composed of an elongated fluorescent lamp 221 and a fluorescent light guide member 222 fabricated by forming a sheet-shaped material containing a phosphor.

When light is irradiated to the surface of the fluorescent light guide member 222, the phosphor contained in the fluorescent light guide member 222 is stimulated by the light to radiate fluorescence. The fluorescence 127 advances to the end face by repeating total reflection inside of the fluorescent light guide member 222. Therefore, the fluorescence having a high intensity is linearly radiated from the end face of the fluorescent light guide member 222 in such a form that energy of the light irradiated to the surface of the fluorescent light guide member 222 is condensed. Accordingly, light 223 produced by the fluorescent lamp 221 is made to impinge upon the surface of the fluorescent light guide member 222, and the fluorescence excited by the light 223 in the fluorescent light guide member 222 is radiated from the end face of the fluorescent light guide member 222, thereby to obtain linear stimulating rays. In this embodiment, the fluorescent lamp 221 is disposed below the stimulable phosphor sheet 2, the fluorescent light guide member 222 is rounded to surround the overall circumference of the fluorescent lamp 221, and an end face 222a of the fluorescent light guide member 222 extends close to and facing the stimulable phosphor sheet 2 in the direction normal to the direction of movement of the read-out and erasing unit 204. Also, the end face 222a of the fluorescent light guide member 222 is closely contacted with a cylindrical lens 225 for converging the fluorescence, which is radiated from the end face 222a, , to a predetermined thickness on the stimulable phosphor sheet 2 only in the direction of movement of the read-out and erasing unit 204.

By way of example, the fluorescent light guide member 222 is composed of a plastic material and a phosphor dispersed therein. In this embodiment, the fluorescent light guide member 222 is selected so that it radiates the fluorescence mainly having a wavelength of 600 nm upon receiving the light 223 produced by the fluorescent lamp 221. As the fluorescent light guide member 222, a product is supplied by Bayer Japan under the trade name LISA-PLASTIC. A reflection member such as a deposition film formed of aluminum, a metal surface, or a white paint layer may be provided on an end face 222b of the fluorescent light guide member 222 opposite to the end face 222a.

Figure 10:
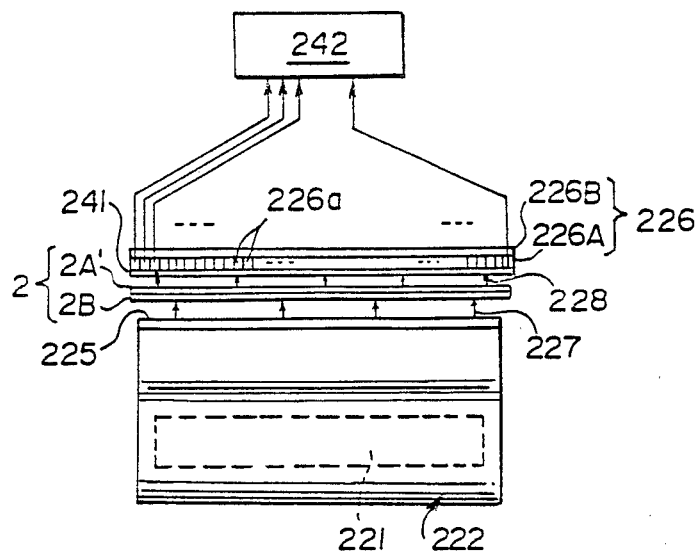

On the other hand, the line sensor 226 is disposed above the stimulable phosphor sheet 2 to face the end face 222a of the fluorescent light guide member 222. As shown in detail in FIGS. 10 and 11, the line sensor 226 comprises a supporting material 226B extending in the width direction of the stimulable phosphor sheet 2, and a light receiving device array 226A divided in accordance with picture elements and secured to the supporting material 226B. Also, a filter 241 for absorbing fluorescence 227 radiated as stimulating rays from the end face 222a and transmitting light 228 emitted by the stimulable phosphor sheet 2 in proportion to the stored radiation energy is disposed between the line sensor 226 and the stimulable phosphor sheet 2.

The stimulable phosphor sheet 2 is composed of the substrate 2A' facing the line sensor 226, and the stimulable phosphor layer 2B formed of BaFBr:Eu or the like and overlaid on the substrate 2A'. The stimulable phosphor layer 2B is excited mainly by light having a wavelength of 600 nm to emit the light 228 of an intensity proportional to the level of the stored radiation energy.

In the course of the image read-out from the stimulable phosphor sheet 2, the fluorescent lamp 221 is turned on. As mentioned above, the phosphor contained in the fluorescent light guide member 222 produces fluorescence 227 mainly having a wavelength of 600 nm upon receiving the light 223 produced by the fluorescent lamp 221. The fluorescence 227 is collectively radiated from the end face 222a of the fluorescent light guide member 222, converged by the cylindrical lens 225 only in the direction of conveyance of the read-out and erasing unit 204, and linearly irradiated to the stimulable phosphor sheet 2. The fluorescence 227 has the wavelength within the stimulation wavelength range of the stimulable phosphor layer 2B as mentioned above, and therefore the portion of the stimulable phosphor sheet 2 exposed to the fluorescence 227 emits the light 228 in proportion to the stored radiation energy (i.e. the light 228 carrying the stored radiation image).

The light 228 emitted by the stimulable phosphor sheet 2 is received by the light receiving device array 226A of the line sensor 226 via the filter 241 for selectively transmitting the light 228. Of the fluorescence 227, the fluorescence passing through the stimulable phosphor sheet 2 is absorbed by the filter 241, and is not received by the light receiving device array 226A. The light receiving device array 226A comprises a plurality of solid state photoelectric conversion devices 226a, 226a, . . . corresponding to the respective picture elements and arrayed in the width direction of the stimulable phosphor sheet 2. The light 228 is received simultaneously by the solid state photoelectric conversion devices 226a, 226a, . . . Upon receiving the light 228, the devices 226a, 226a, . . . generate photocarriers and temporarily store signals obtained thereby. The stored signals are sequentially read out by a scanning circuit 242, and read-out of a single linear exposed portion (corresponding to a single scanning line) of the stimulable phosphor sheet 2 is finished.

Figure 11:
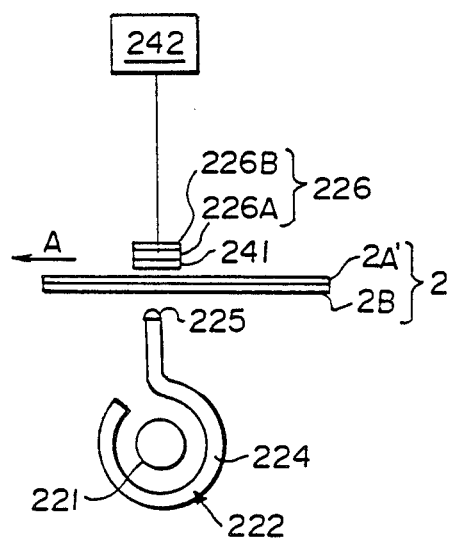

Then, the read-out and erasing unit 204 is moved by the unit movement means 40 with respect to the stimulable phosphor sheet 2 by a distance equal to the spacing of a single scanning line in the direction as indicated by the arrow A in FIGS. 8A and 11, and the aforesaid read-out step is repeated. The read-out operation is repeated over the overall surface of the stimulable phosphor sheet 2, and the radiation image stored on the overall surface of the sheet 2 is read out.

Figure 12:
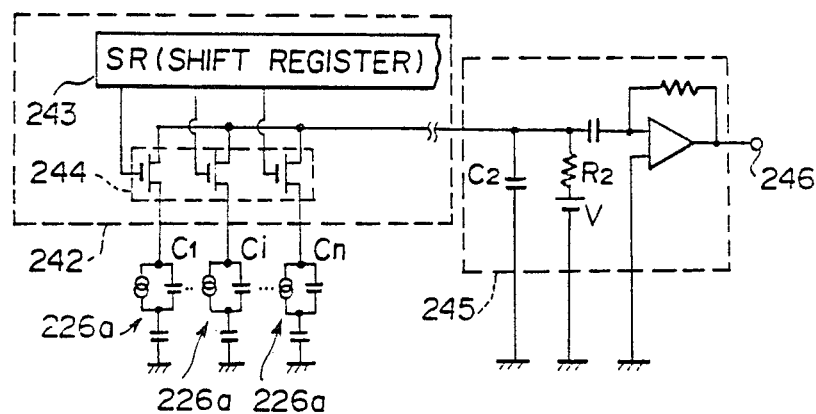
FIG. 12 is a circuit diagram showing the scanning circuit used in the embodiment shown in FIG. 8A, FIGS. 13 and 14 are side views showing further embodiments of the second radiation image recording and read-out apparatus in accordance with the present invention.

The scanning circuit 242 following the line sensor 226 will be described hereinbelow. FIG. 12 is an equivalent circuit diagram showing a line sensor using a photoconductor and a scanning circuit. Signals caused by photocarriers generated when the light 228 emitted by the stimulable phosphor sheet 2 impinges upon the solid state photoelectric conversion devices 226a, 226a, . . . using a photoconductor are accumulated at capacitors $C_i$ ($i = 1, 2, \ldots, n$) of the solid state photoelectric conversion devices 226a, 226a, . . . The accumulated signals of the photocarriers are sequentially read out by switching of a switch section 244 controlled by a shift register 243, and time-serial image signals are obtained thereby. The image signals are then amplified by an amplifier 245 and are sent out from an output terminal 246 of the amplifier 245. By use of the image signals, the radiation image can be displayed on a CRT, or a hard copy of the radiation image can be obtained with a scanning recording apparatus or the like.

The MOS section comprising the switch section 244 and the shift register 243 may be replaced by a charge coupled device (CCD).

At the time the image read-out is finished in the manner as mentioned above, the read-out and erasing unit 204 has been moved to its second position as indicated by the broken line in FIG. 8A. Thereafter, as shown in FIG. 8B, the read-out and erasing unit 204 is conveyed in the direction as indicated by the arrow A' from its second position to its first position, and the overall surface of the stimulable phosphor sheet 2 is exposed to the erasing light produced by the erasing means 30 in the read-out and erasing unit 204 conveyed in the direction as indicated by the arrow A'.

With the embodiment shown in FIG. 8A wherein the stimulable phosphor sheet 2 is secured and held to face the image recording means 10, the image read-out means comprising the stimulating ray irradiation means and the line sensor and the erasing means are formed integrally with each other as the read-out and erasing unit 204, and the read-out and erasing unit 204 is reciprocated for carrying out the image read-out and the erasing, the width of the apparatus can be reduced to a value nearly equal to the length of a single stimulable phosphor sheet. Also, since the line sensor is used as the photoelectric read-out means, the image read-out means itself can be made compact, and the read-out and erasing unit 204 can be made small. Further, the erasing light is irradiated to the stimulable phosphor sheet while the erasing means is moved, the erasing can be effected substantially by use of the erasing light source smaller than in the case where the erasing light is irradiated at one time to the overall surface of the stimulable phosphor sheet. The erasing means can be disposed close to the stimulable phosphor sheet, the erasing efficiency can be improved. Particularly, with this embodiment wherein a combination of the fluorescent light guide member and the fluorescent lamp is utilized as the stimulating ray irradiation means, the efficiency of utilization of stimulating rays can be improved.

Figure 13:
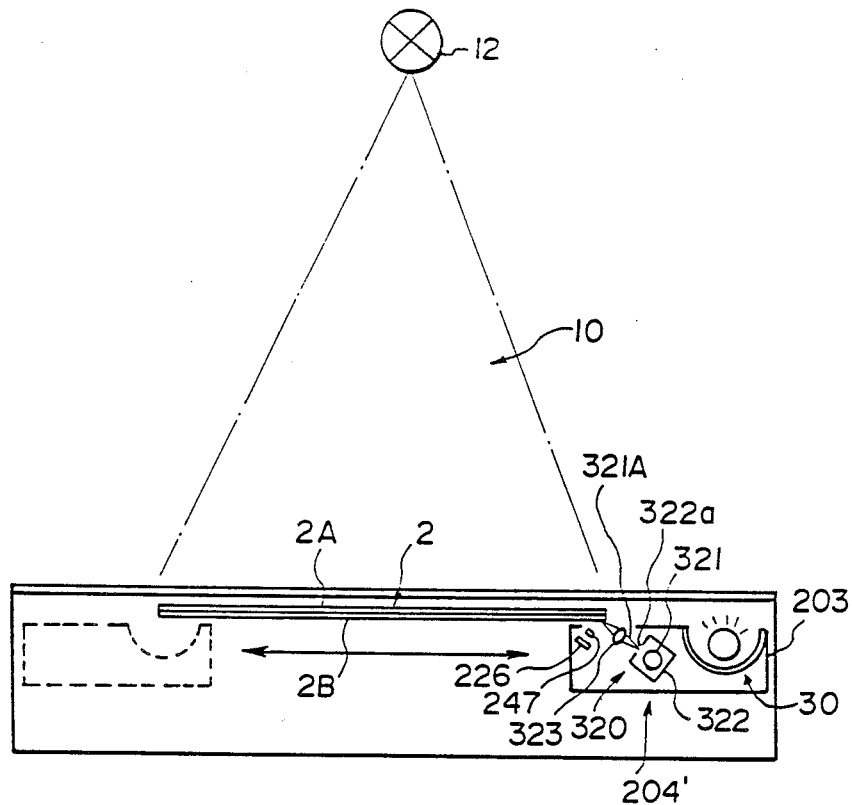
Figure 14:
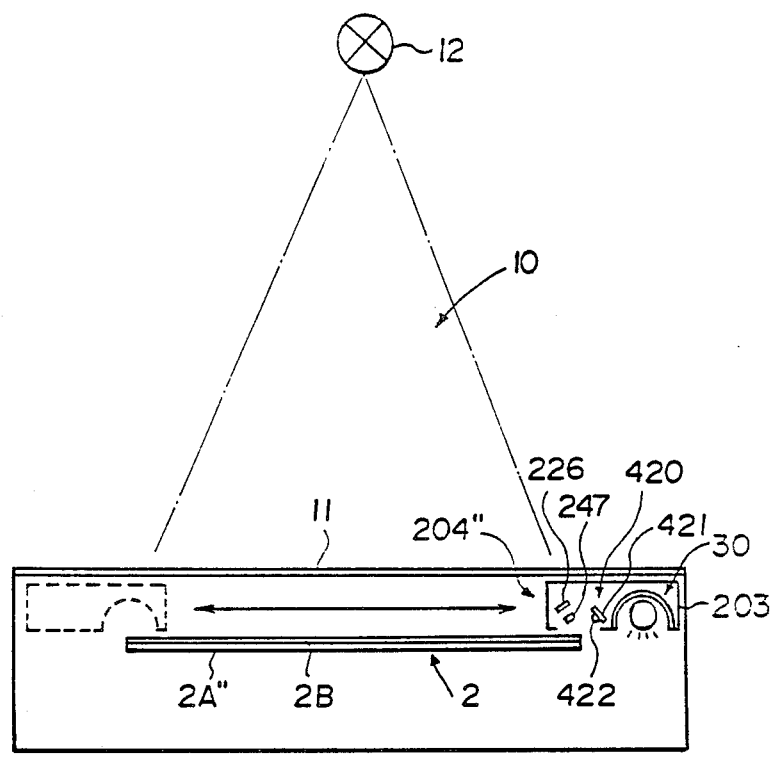

Also, in the radiation image recording and read-out apparatus as mentioned above, it is necessary to adjust the wavelength range of stimulating rays as the read-out light to predetermined range. To satisfy this requirement, various light sources can be used as desired by selecting the fluorescent light guide member 222. As the stimulating ray source in the embodiment shown in FIG. 8A, any light source may be used insofar as it produces light having a wavelength shorter than the wavelength of the fluorescence radiated by the phosphor contained in the fluorescent light guide member 222. For example, a sodium lamp, a mercury vapor lamp, an electroluminescent panel or the like may also be used for this purpose. Also, as the phosphor contained in the fluorescent light guide member 222, the organic phosphors as mentioned above may be used. Also, it is only necessary that the fluorescent light guide member 222 be disposed so that light produced by the light source impinges upon the surface of the fluorescent light guide member 222 and one end face extends close to the stimulable phosphor sheet in the width direction of the stimulable phosphor sheet. Instead of surrounding the overall circumference of the fluorescent lamp in the manner as mentioned above, the fluorescent light guide member 222 may be formed in any other shape. As the stimulating ray irradiation means, instead of the means provided with the fluorescent light guide member 222, any other means may be used. Also, the configuration of the read-out and erasing unit 204 is not limited to the one as in the embodiment shown in FIG. 8A. Further embodiments of the second radiation image recording and read-out apparatus in accordance with the present invention will hereinbelow be described with reference to FIGS. 13 and 14. In FIGS. 13 and 14, similar elements are numbered with the same reference numerals with respect to FIG. 8A.

With reference to FIG. 13, a read-out and erasing unit 204′ disposed below the stimulable phosphor sheet 2 is reciprocally moved by the same unit movement means (not shown) as in the embodiment shown in FIG. 8A. A stimulating ray irradiation means 320, the line sensor 226 and the erasing means 30 are housed in the case 203. Therefore, detection of the light emitted by the stimulable phosphor sheet 2 is carried out on the same side as the stimulating ray irradiation side, i.e. on the lower surface of the stimulable phosphor sheet 2. The stimulating ray irradiation means 320 and the line sensor 226 are disposed at an oblique angle with the position of irradiation of stimulating rays intervening therebetween. In this embodiment, the stimulating ray irradiation means 320 comprises a stimulating ray source 321 extending at an angle normal to the drawing sheet in FIG. 13 for producing stimulating rays 321A, a light source case 322 having a slit 322a which extends at an angle normal to the drawing sheet in FIG. 13 and through which the stimulating rays 321A are radiated, and a long cylindrical lens 323 disposed in the optical path of the divergent stimulating rays 321A radiated through the slit 322a for converging the stimulating rays 321A on the stimulable phosphor sheet 2 only in the direction of movement of the read-out and erasing unit 204′. Also, in this embodiment, the line sensor 226 is slightly spaced from the stimulable phosphor sheet 2, and therefore a microlens array 247 composed of a plurality of microlenses corresponding to the respective light receiving devices of the line sensor 226 and arrayed integrally with one another is disposed between the stimulable phosphor sheet 2 and the line sensor 226, so that the light emitted by the stimulable phosphor sheet 2 is efficiently made to impinge upon the line sensor 226. In the case where the stimulable phosphor sheet 2 is disposed with the substrate 2A facing the radiation source 12 as shown, the substrate 2A need not necessarily be transparent and it is only necessary that the substrate 2A be permeable to radiation.

On the other hand, in the embodiment shown in FIG. 14, a read-out and erasing unit 204″ is disposed between the stimulable phosphor sheet 2 and the image recording table 11, and the image read-out and the erasing are carried out on the same side as the surface of the stimulable phosphor sheet 2 to which the radiation is irradiated. Therefore, the stimulable phosphor sheet 2 is secured and held so that the substrate 2A″ faces down and the stimulable phosphor layer 2B faces up. In this case, the substrate 2A″ need not necessarily be transparent nor permeable to radiation. Also, the read-out and erasing unit 204″ is reciprocally moved in the direction as indicated by the arrow between the stimulable phosphor sheet 2 and the image recording table 11. Though the unit movement means for moving the read-out and erasing unit 204″ is not shown, for example, the length of the read-out and erasing unit 204″ in the direction normal to the drawing sheet in FIG. 14 may be made slightly longer than the width of the stimulable phosphor sheet, and a movement means of the same type as in the aforesaid embodiment may be associated with the the edge portion of the read-out and erasing unit 204″. Also, a stimulating ray irradiation means 420 in this embodiment is composed of a LED array 421 comprising a plurality of light emitting diodes (LED) at an angle normal to the drawing sheet in FIG. 14, and a cylindrical lens 422 provided on the stimulating ray radiating surface of the LED array 421. As in the embodiment shown in FIG. 13, the photoelectric read-out means is constituted by the line sensor 226 and the microlens array 247 disposed at an oblique angle.

The kind of the stimulating ray irradiation means and the position of the read-out and erasing unit in the apparatus are not limited to those shown in FIGS. 8A, 13 and 14, and may be combined in any other manner. For example, the read-out and erasing unit 204' as shown in FIG. 13 may be disposed between the image recording table 11 and the stimulable phosphor sheet 2 in the same manner as the read-out and erasing unit 204" shown in FIG. 14. Also, the read-out and erasing unit 204" as shown in FIG. 14 may be disposed below the stimulable phosphor sheet 2 in the same manner as the read-out and erasing unit 204' shown in FIG. 13. Further, the stimulating ray irradiation means may face the line sensor via the stimulable phosphor sheet 2.

An embodiment of the third radiation image recording and read-out apparatus in accordance with the present invention will hereinbelow be described with reference to FIGS. 15A and 15B. In FIG. 15A, similar elements are numbered with the same reference numerals with respect to FIGS. 1A and 14.

Figure 16:
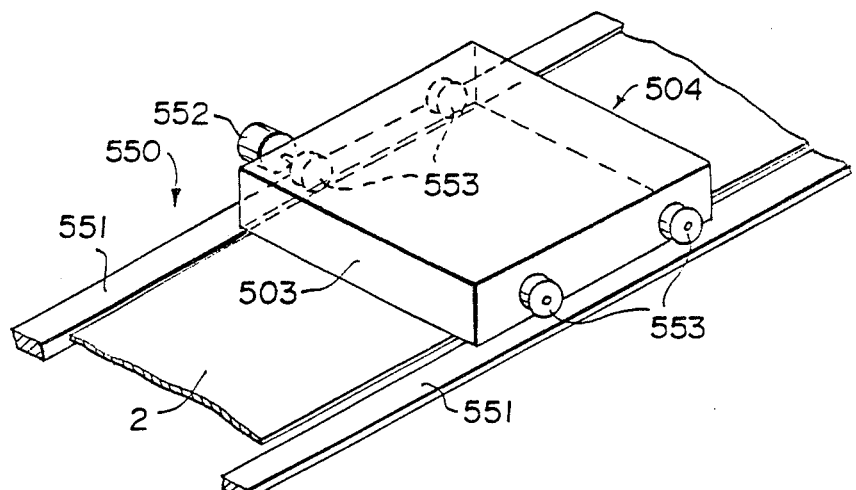
FIG. 16 is a perspective view showing the read-out and erasing unit and the movement means for the read-out and erasing unit in the embodiment shown in FIG. 15A, FIGS. 17 and 19 are side views showing further embodiments of the third radiation image recording and read-out apparatus in accordance with the present invention.

With reference to FIGS. 15A and 15B, a read-out and erasing unit 504 comprises a case 503, and an image read-out means 540 composed of the stimulating ray irradiation means 420 and the line sensor 226 as the photoelectric read-out means, and erasing means 30 and 70, which are housed in the case 503. The read-out and erasing unit 504 is disposed between the image recording table 11 and the stimulable phosphor sheet 2. The read-out and erasing unit 504 is reciprocally moveable in the same manner as the read-out and erasing unit 4 in the embodiment shown in FIG. 1A. By way of example, as shown in FIG. 16, a unit movement means 550 for reciprocally moving the read-out and erasing unit 504 is constituted by rails 551, 551 extending in the direction of movement of the read-out and erasing unit 504, and four wheels 553, 553, . . . provided on side surfaces of the case 503 and operated by a motor 552 to move forward and backward along the rails 551, 551.

The read-out and erasing unit 504 is disposed at its first position, and a radiation image of the object 13 is stored on the stimulable phosphor layer 2B of the stimulable phosphor sheet 2 by the image recording means 10. After the image recording is finished, the image read-out from the stimulable phosphor sheet 2 is carried out by the image read-out means 540 composed of the stimulating ray irradiation means 420 and the line sensor 226 in the read-out and erasing unit 504. In this step, the read-out and erasing unit 504 is slightly moved in the direction as indicated by the arrow A from the first position to an intermediate position at which stimulating rays can impinge upon the edge portion of the stimulable phosphor sheet 2, and the image read-out is started from said intermediate position.

After the image read-out from a single scanning line is completed by the line sensor 226 connected to the scanning circuit 242 as shown in FIG. 12, the read-out and erasing unit 504 is moved by the unit movement means 550 by a distance equal to the spacing of a single scanning line in the direction as indicated by the arrow A in FIG. 15A, and the aforesaid read-out operation is repeated. The read-out operation is repeated for the overall surface of the stimulable phosphor sheet 2, and the radiation image stored on the overall surface of the stimulable phosphor sheet 2 is read out.

As mentioned above, the erasing means 30 and 70 are provided on either side of the image read-out means 540. At the same time as the read-out and erasing unit 504 is moved in the direction as indicated by the arrow A and the image read-out is carried out, the erasing means 30 that is present on the upstream side as viewed in the direction of the forward movement of the read-out and erasing unit 504 is turned on to sequentially erase the portions of the stimulable phosphor sheet 2 at which the image read-out has been finished. At this time, the erasing means 70 is maintained off.

In the erasing means 30, the reflection plate 32 provided for reflecting a part of the erasing light, that is radiated upwardly by the erasing light source 31, toward the surface of the stimulable phosphor sheet 2 also acts as a light shielding means for shielding the image read-out means 540 from the erasing light. As the read-out and erasing unit 504 is moved in the direction as indicated by the arrow A, the erasing light source 31 is also moved. In this manner, the stimulable phosphor sheet 2 is exposed to the erasing light immediately after the image read-out from th sheet 2 is carried out by the image read-out means 540, and the overall surface of the sheet 2 is sequentially exposed to the erasing light as the erasing means 30 is moved. At the time the read-out and erasing unit 504 has been moved to the second position as indicated by the solid line in FIG. 15B, the erasing is finished over the overall surface of the stimulable phosphor sheet 2, and the stimulable phosphor sheet 2 becomes reusable for image recording by the image recording means 10.

The next image recording is carried out by the image recording means 10 with the read-out and erasing unit 504 being disposed at its second position as shown in FIG. 15B. The read-out and erasing unit 504 is then moved by the unit movement means 550 in the direction as indicated by the arrow A' to the first position, and the image read-out is carried out by the image read-out means 540 in the read-out and erasing unit 504. At this time, the image read-out is carried out in the same manner as the aforesaid image read-out in the course of the forward movement, except that the direction of the image read-out is reversed. In the case where it is not desirable that the directions of reproduced visible images which are finally obtained become reverse to each other between the image read-out in the forward movement and the image read-out in the backward movement, the sequence of output of the image signals from the image read-out means 540 may be reversed between the image read-out in the forward movement and the image read-out in the backward movement.

In the course of the backward movement of the read-out and erasing unit 504, the image read-out is carried out as mentioned above, and the erasing is carried out by the erasing means 70 which is present on the upstream side of the image read-out means 540 as viewed in the backward movement direction. The configuration of the erasing means 70 is exactly the same as the configuration of the erasing means 30. The erasing means 70 is moved in the direction as indicated by the arrow A' integrally with the image read-out means 540, and sequentially erase the portions of the stimulable phosphor sheet 2 on which the image read-out has been finished. Therefore, at the time the read-out and erasing unit 504 has been returned to its first position, the stimulable phosphor sheet 2 is erased over the overall surface and becomes reusable for image recording.

With this embodiment wherein the two erasing means are provided in the read-out and erasing unit, the read-out and the erasing can be carried out in the course of each of the forward movement and the backward movement, and the read-out of two images and the erasing for the two images can be accomplished while the read-out and erasing unit is once reciprocated. Accordingly, processing of a plurality of images can be carried out quickly. Also, the two erasing means are housed in the read-out and erasing unit and moved, and therefore they may be small. Even though the two erasing means are provided in the read-out and erasing unit, the unit does not become so large.

In the embodiment shown in FIG. 15A, the erasing means 70 must be maintained off in the course of the forward movement, and the erasing means 30 must be maintained off in the course of the backward movement. However, the erasing light sources of the erasing means 30 and 70 may always be maintained on in the case where moveable shutters or the like for intercepting the erasing light and retracting from the positions below the erasing light sources to lay bare the erasing light sources only when the erasing is to be carried out are provided below the erasing light sources.

Figure 17:
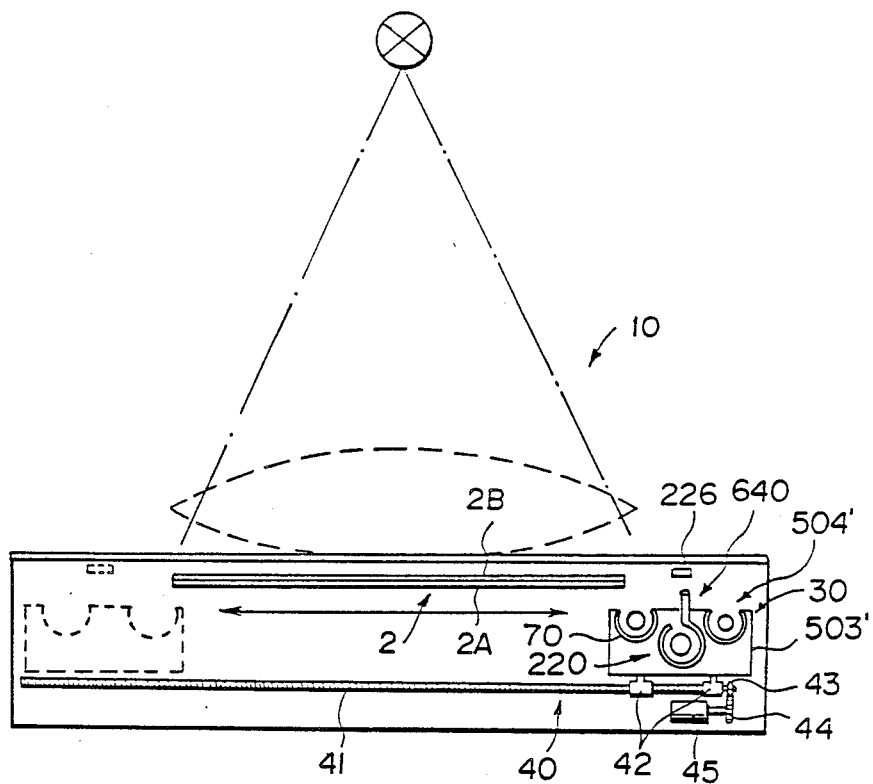

As the stimulating ray irradiation means in the third radiation image recording and read-out apparatus in accordance with the present invention, instead of the aforesaid LED array 421, the fluorescent light guide member 222 as shown in FIG. 9 may be utilized. An embodiment wherein the fluorescent light guide member 222 is utilized as the stimulating ray irradiation means will hereinbelow be described with reference to FIG. 17. In FIG. 17, similar elements are numbered with the same reference numerals with respect to FIG. 8A.

Figure 18:
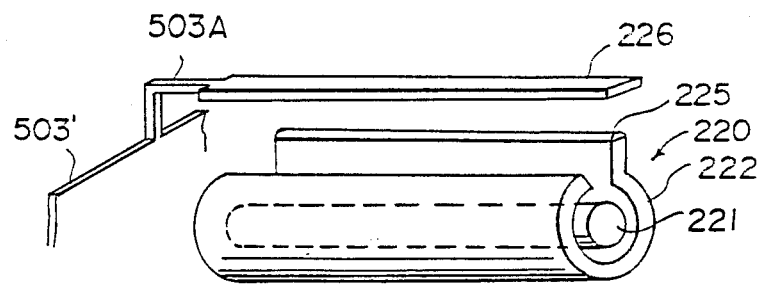
FIG. 18 is a perspective view showing the image read-out means provided with a fluorescent light guide member.

With reference to FIG. 17, a read-out and erasing unit 504′ comprises a case 503′ disposed below the stimulable phosphor sheet 2 and housing the stimulating ray irradiation means 220 and the erasing means 30 and 70, and the line sensor 226 facing the stimulating ray irradiation means 220 in the case 503′ via the stimulable phosphor sheet 2. As shown in FIG. 18, the line sensor 226 is secured to the case 503′ by a supporting means 503A, and is moveable integrally with the case 503′. In FIG. 18, similar elements are numbered with the same reference numerals with respect to FIG. 9. In this embodiment, the substrate 2A′ of the stimulable phosphor sheet 2 is transparent.

In the embodiment shown in FIG. 17, stimulating rays produced by the stimulating ray irradiation means 220 provided with the fluorescent light guide member 222 excite the stimulable phosphor sheet 2 from its lower surface, and the light emitted by the upper surface of the sheet 2 upon exposure to stimulating rays is detected by the line sensor 226. Also, the erasing by the erasing means 30 and 70 is carried out for the stimulable phosphor layer 2B from the side of the lower surface of the stimulable phosphor sheet 2 via the transparent substrate 2A′.

Figure 19:
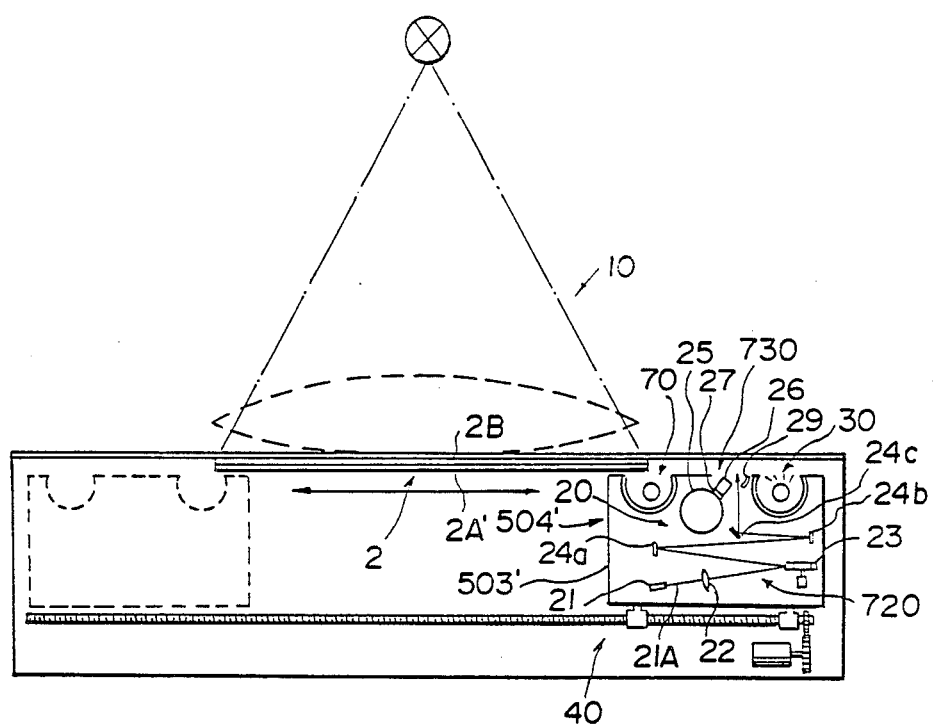

In the third radiation image recording and read-out apparatus in accordance with the present invention, the image read-out means is not limited to the combination of the means for linearly irradiating the stimulating rays with the line sensor, and may be constituted to scan the stimulating rays in the main scanning direction on the stimulable phosphor sheet which is scanned in the sub-scanning direction by the movement of the read-out and erasing unit, thereby to cause the stimulable phosphor sheet to emit light and to detect the emitted light, as in the embodiment shown in FIG. 1A. An embodiment wherein the system for scanning the stimulating rays is utilized will hereinbelow be described with reference to FIG. 19. In FIG. 19, similar elements are numbered with the same reference numerals with respect to FIG. 1A.

With reference to FIG. 19, the image read-out means 20 and the erasing means 30 and 70 are housed in a case 503 which is moveable below the stimulable phosphor sheet 2 by the unit movement means 40. A stimulating ray irradiation means 720 of the image read-out means 20 is constituted in the same manner as the stimulating ray scanning means in the embodiment shown in FIG. 1A, and the stimulating rays 21A are repeatedly scanned by the stimulating ray irradiation means 720 in the main scanning direction on the stimulable phosphor sheet 2. On the other hand, a read-out and erasing unit 504 is conveyed by the unit movement means 40 at a predetermined speed in the direction as indicated by the arrow, so that the scanning position of the stimulating rays 21A is moved in the direction as indicated by the arrow to effect sub-scanning. Also, in this embodiment, a photoelectric read-out means 730 is constituted in the same manner as the photoelectric read-out means in the embodiment shown in FIG. 1A.

In the third radiation image recording and read-out apparatus in accordance with the present invention as shown in FIGS. 15A, 15B, 17 and 19, two erasing means 30 and 70 are provided on both sides of a single image read-out means 20.

Alternatively, it is possible to use two image read-out means provided on both sides of a single erasing means. Such a kind of embodiments will now be described with reference to FIGS. 20A to 23 as the fourth radiation image recording and read-out apparatus.

An embodiment of the fourth radiation image recording and read-out apparatus in accordance with the present invention will hereinbelow be described with reference to FIGS. 20A and 20B. In FIGS. 20A and 20B, similar elements are numbered with the same reference numerals with respect to FIGS. 1A to 19, and the detailed description thereof will be omitted.

With reference to FIGS. 20A and 20B, a read-out and erasing unit 604 comprises a case 603, and an image read-out means 20 and an erasing means 30 housed therein. The image read-out means 20 is composed of a single optical scanning means for irradating stimulating rays 21A and two image read-out means 620, wherein the stimulating ray 21A is changed over by a change-over mirror 24b′ so that the stimulating rays 21A are selectively guided to different positions before the two image read-out means 620. The two image read-out means 620 are located on opposite sides of the erasing means 30 in the direction of movement of the case 603 of the read-out and erasing unit 604, whereby one of the image read-out means 620 located in front of the erasing means 30 when the unit 604 is moved is operated to detect the light emitted by the stimulable phosphor sheet 2.

When the read-out and erasing unit 604 is on the right side as shown in FIG. 20A, the change-over mirror 24b′ is in its left position as indicated by the solid line and reflects the stimulating rays 21A reflected from the rotating polygon mirror 23 toward the left side mirror 24c so that the stimulating rays 21A may irradiate the stimulable phosphor sheet 2 at the left (as viewed in FIGS. 20A and 20B) side of the unit 604 and then the unit 604 is moved leftward in the direction of arrow A. During this movement the left side image read-out means 620 is operated to detect the light emitted by the stimulable phosphor sheet 2. Then, when the unit 604 is moved up to the left end and is moved to the right in the direction of arrow A′ as shown in FIG. 20B, the change-over mirror 24b′ is moved to the right to allow the stimulating rays 21A pass by toward the right side of the unit 604 so that the stimulating rays 21A may irradiate the stimulable phosphor sheet 2 at the right side of the unit 604. During the movement of the unit 604 toward the right side as shown in FIG. 20B, the right side image read-out means 620 is operated to detect the light emitted by the stimulable phosphor sheet 2.

In both cases, the erasing means 30 is operated to erase the image remaining on the stimulable phosphor sheet 2 after the image read-out means 620 has finished reading.

Figure 21:
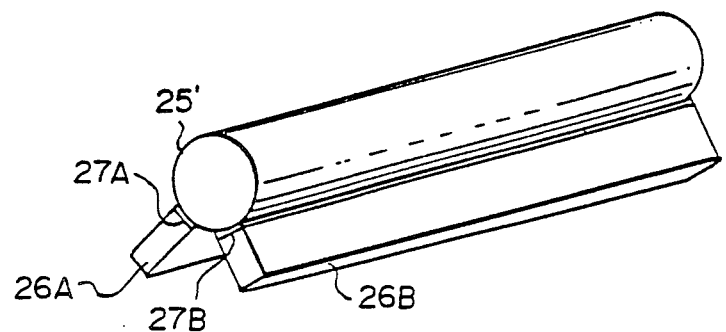
FIG. 21 is a perspective view showing an example of photomultiplier useful in the fourth radiation image recording and read-out apparatus.

In the above embodiment shown in FIGS. 20A and 20B, two photomultipliers 25 are employed. However, they may be combined into one as shown in FIG. 21. The photomultiplier 25′ as shown in FIG. 21 has two light guide members 26A and 26B with filters 27A and 27B interposed between the light guide members 26A and 26B and the photomultiplier 25′, respectively, and is able to detect light through both light guide members 26A and 26B. When this kind of photomultiplier is employed, the single erasing means 30 is located between the two light guide members 26A and 26B.

Figure 22:
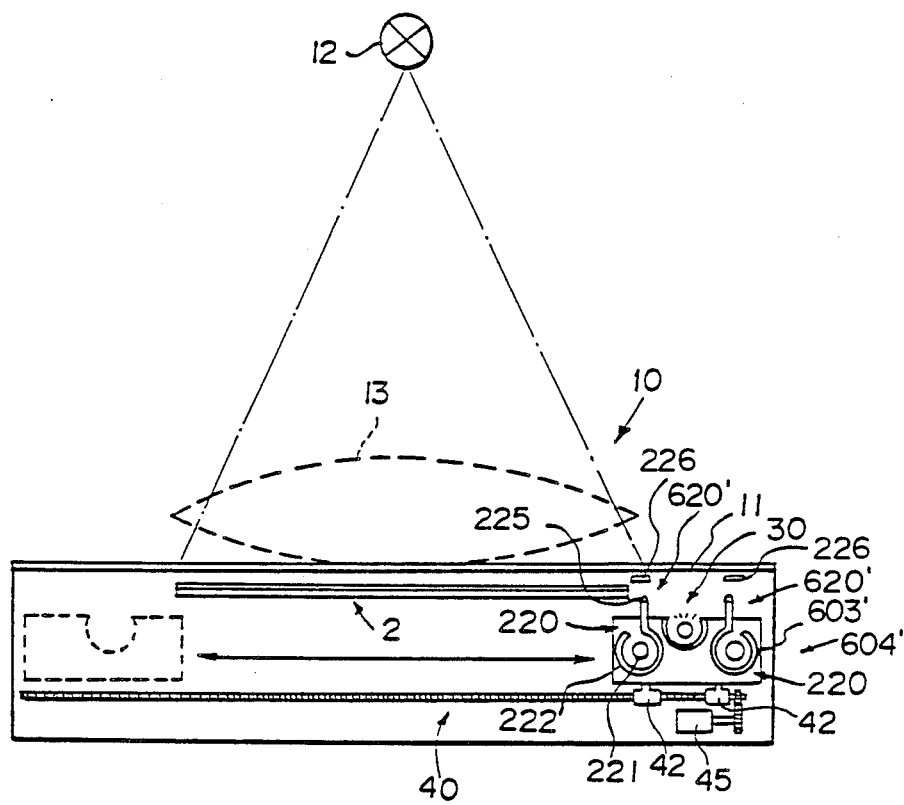
FIGS. 22 and 23 are side views showing further embodiments of the fourth radiation image recording and read-out apparatus in accordance with the present invention.

In the above embodiment shown in FIGS. 20A and 20B photomultipliers 25, 25 are employed as the image read-out means 620. It may be replaced by a line sensor as done in the embodiment shown in FIGS. 8A and 8B. Further, the stimulating ray irradiation means may be replaced by a fluorescent lamp 221 and a fluorescent light guide member as done in the embodiment shown in FIGS. 8A and 8B. FIG. 22 shows such an embodiment of the fourth radiation image recording and read-out apparatus. In FIG. 22, similar elements are numbered with the same reference numerals with respect to FIGS. 8A and 8B.

Two image read-out means 620′ composed of line sensors 226 and the stimulating ray irradiation means 220 are provided in a case 603′ together with a single erasing means 30 located between the two stimulating ray irradiation means 220. The stimulating ray irradiation means 220 is composed of an elongated fluorescent lamp 221 and a fluorescent light guide member 222 similarly to the embodiment shown in FIGS. 8A and 8B. The operation of this embodiment is the same as that of the above embodiment shown in FIGS. 20A and 20B.

Figure 23:
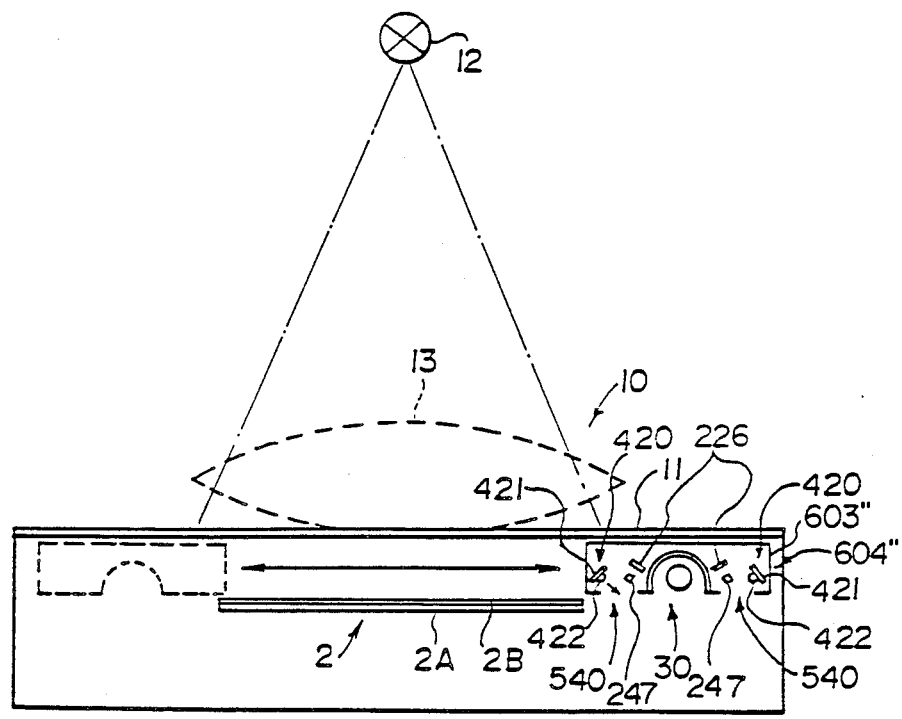

Still another embodiment of the fourth radiation image recording and read-out apparatus is shown in FIG. 23 in which the image read-out means 540 is of the LED array and line sensor type as shown in FIG. 14. Similar elements are all numbered with the same reference numerals with respect to FIG. 14 in FIG. 23. As obvious from the drawing, the embodiment shown in FIG. 23 is a combination of the embodiment shown in FIG. 14 and the embodiment shown in FIGS. 20A and 20B. Since the operation thereof will be quite obvious from the reference numerals and the description made hereinabove, the detailed description thereof is omitted here.

In the above-described embodiments, the read-out and erasing unit is able to carry out the image read-out and the erasing by moving back and forth along the stimulable phosphor sheet. However, since the erasing is carried out simultaneously with the image read-out, the speed of movement of the unit is determined or controlled by the speed of erasing, that is the image read-out which can be carried out faster than the erasing must be conducted at the lower speed for carrying out the erasing. This is disadvantageous from the viewpoint of time efficiency. Accordingly, it is desirable to carry out the image read-out at a higher speed than the erasing by use of the read-out and erasing unit. Such embodiments will now be described with reference to FIGS. 24A to 27 which show the fifth radiation image recording and read-out apparatus.

Figure 24A:
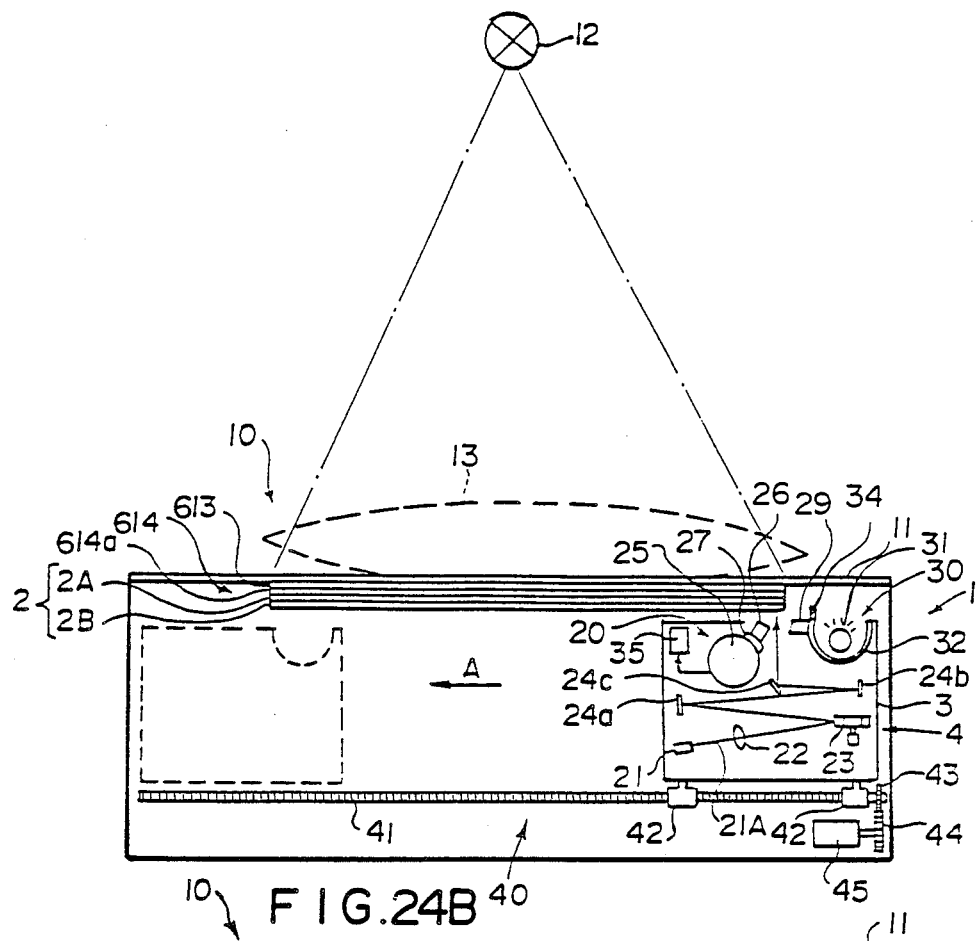
FIGS. 24A and 24B are side views showing an embodiment of the fifth radiation image recording and read-out apparatus in accordance with the present invention.
Figure 24B:
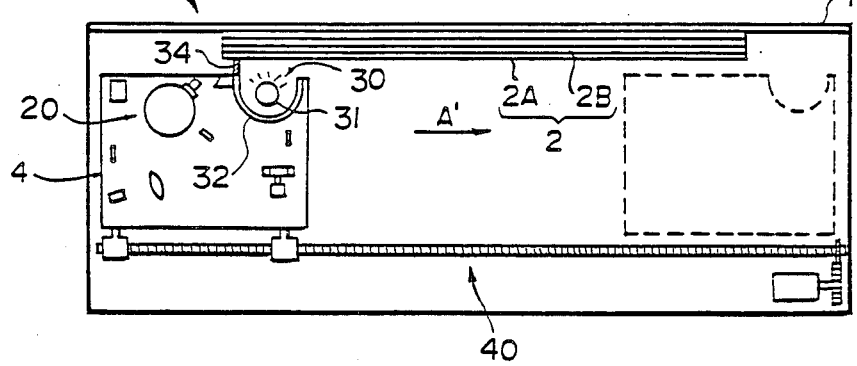

FIGS. 24A and 24B as well as 25 show the first embodiment of the fifth radiation image recording and read-out apparatus which is similar to the embodiment shown in FIGS. 1A and 1B, wherein the similar elements are numbered with the same reference numerals with respect to FIGS. 1A and 1B. Since the structure and the operation of those elements would be obvious from the reference numerals and the aforesaid embodiments, the detailed description thereof is omitted here. Only the different parts of the embodiment which are not described in the foregoing embodiments will be described.

Figure 25:
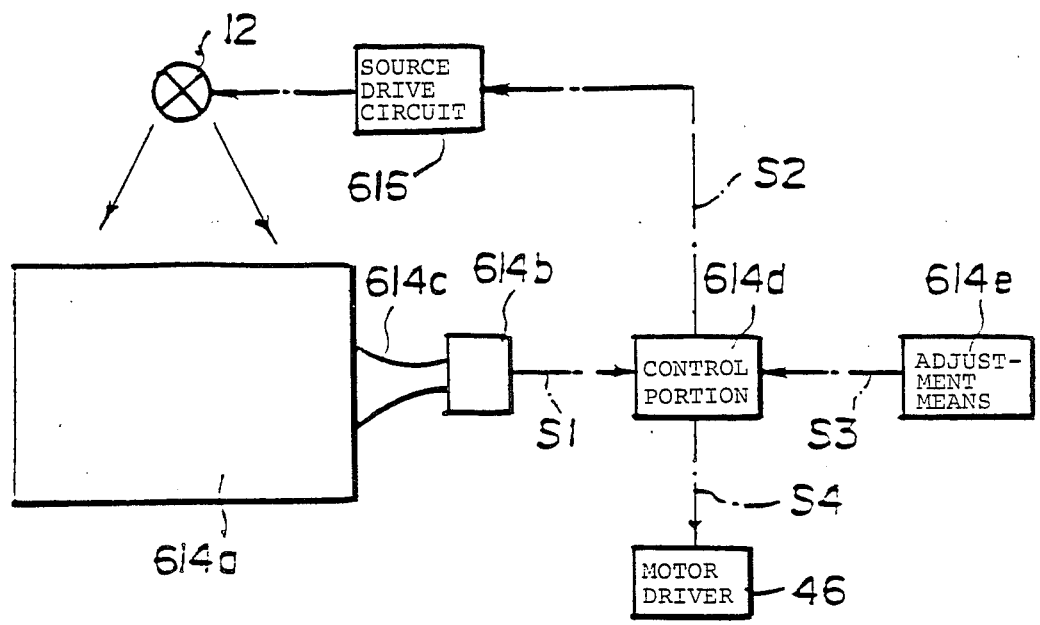
FIG. 25 is a schematic view showing the way of control of the radiation source by use of a photo-timer.

A grid 613 is provided beneath the image recording table 11 to absorb scattered radiations and obtain a high quality image. Since the grid 613 is not always necessary, it may be removed particularly in case of recording a radiation image of a thin object. The image recording means 10 employed in this embodiment includes a phototimer 614 provided beneath the grid 613. The phototimer 614 is provided between the grid 613 and the stimulable phosphor sheet 2. In more detail, the phototimer 614 comprises as shown in FIG. 25 a phosphor plate 614a disposed between the grid 613 and the stimulable phosphor sheet 2 to receive the radiation which has passed through the object 13, a photodetector 614b such as a photomultiplier, a light collecting optical element 614c coupling the light receiving face of the photodetector 614b with the phosphor plate 614a, and a control portion 614d into which the output S1 of the photodetector 614b is input. The phosphor plate 614a emits light upon exposure to the radiation at the time of recording a radiation image on the stimulable phosphor sheet 2. The emitted light is received and detected by the photodetector 614b through the light collecting optical element 614c. The output S1 of the photodetector 614b is transmitted to the control portion 614d, which in turn outputs a radiation source stoppage signal S2 when the accumulated amount of light received by the photodetector 614b has reached a predetermined level. The signal S2 is sent to a source drive circuit 616 of the radiation source 12 and stops the operation of the radiation source 12 to control the amount of radiation irradiated upon the object 13 to an appropriate value. The predetermined level which is memorized in the control portion 614d can be adjusted by an adjustment means 614e in accordance with various conditions such as the recorded portion of the object, method of recording, read-out gain at the time of read-out and so forth. S3 denotes an adjustment signal output from the adjustment means 614e as mentioned above.

The control portion 614d is further connected with a motor driver 46 for controlling the speed of the motor 45 which operates to rotate the screw rod 41 to move the read-out and erasing unit 4. Hence the speed of movement of the read-out and erasing unit 4 can be controlled in accordance with the amount of radiation to which the stimulable phosphor sheet 2 was exposed at the time of recording. Therefore, it is possible to change the speed of movement of the read-out and erasing unit 4 at the time of erasing according to the recorded radiation energy which requires a different speed of erasing. Further, the erasing is carried out at a lower speed than the image read-out in the above embodiment so that the read-out and the erasing can be carried out respectively at the most appropriate speed.

In FIGS. 24A and 24B, the element designated by the reference numeral 34 is a light shielding member made of a cloth or the like to shield the light from the erasing means 30 to prevent it from entering the image read-out means 20. Further, the element designated by 35 is an image information read-out circuit in which the read out image information is subjected to various kinds of image processing.

Figure 26:
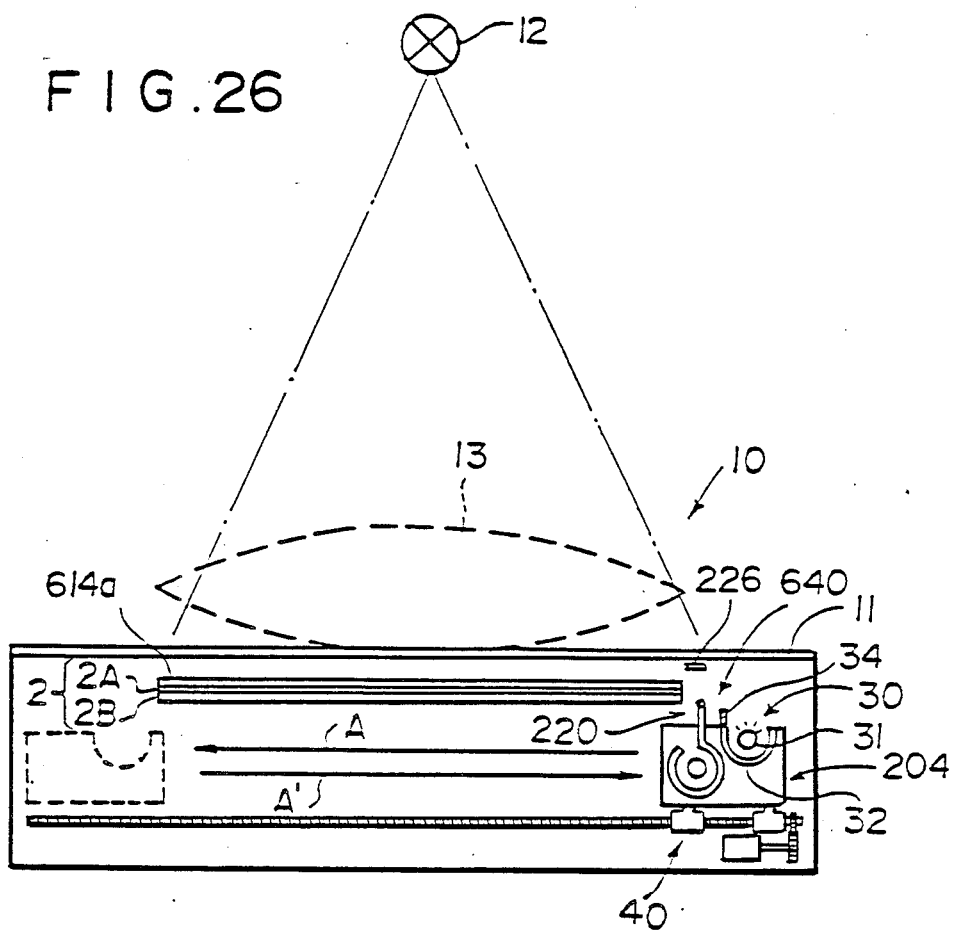
FIGS. 26 and 27 are side views showing further embodiments of the fifth radiation image recording and read-out apparatus in accordance with the present invention.

FIG. 26 shows another embodiment of the fifth radiation image recording and read-out apparatus in which an image read-out means 640 composed of a line sensor 226 and a stimulating ray irradiation means 220 similar to those of the embodiment shown in FIGS. 8A and 8B is employed together with the phototimer 614a.

Figure 27:
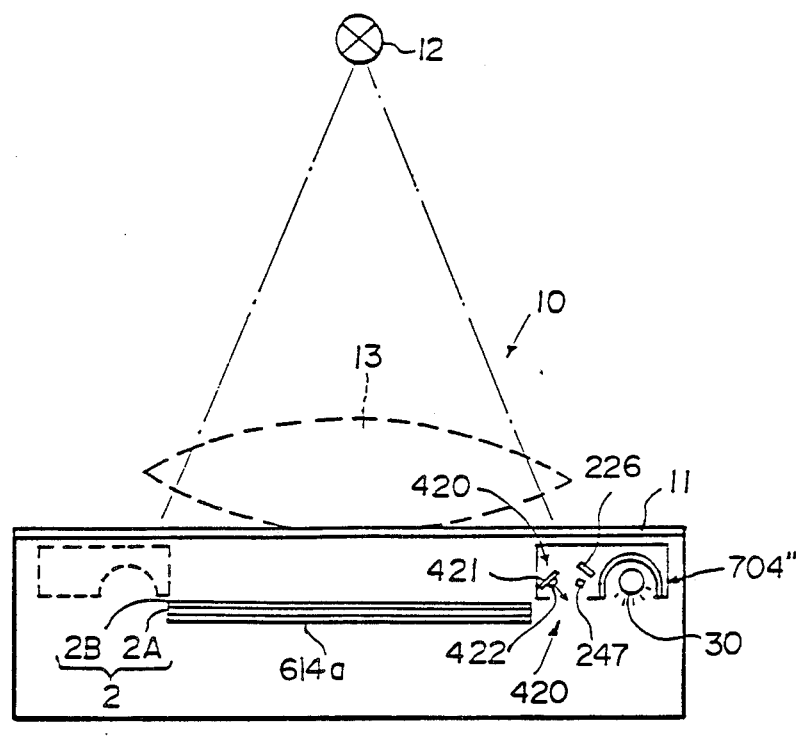

FIG. 27 shows still another embodiment of the fifth radiation image recording and read-out apparatus in which the embodiment shown in FIG. 14 is combined with the embodiment shown in FIGS. 24A and 24B. A phototimer 614a is provided beneath the stimulable phosphor sheet 2 which is provided under the image recording table 11, and the read-out and erasing unit 420 is movable along the stimulable phosphor sheet 2 in a path between the stimulable phosphor sheet 2 and the image recording table 11.

In the above embodiments shown in FIGS. 26 and 27, all the reference numerals similar to those shown in the aforesaid embodiments denote the similar elements and accordingly the structure and operation thereof would be obvious and the description thereof is accordingly omitted.

In the above-described embodiments, the read-out and erasing unit is made into an integral unit and is moved back and forth as a single unit. If the erasing means is separated from the read-out means, it can be moved at a lower speed than the image read-out means to sufficiently erase the remaining image or radiation energy. The sixth radiation image recording and read-out apparatus employs the separate erasing means as shown in FIGS. 28A to 33D.

FIGS. 28A to 28C shows the first embodiment of the sixth radiation image recording and read-out apparatus as mentioned above. As the above-described various embodiments, the similar elements are numbered with the same reference numerals with respect to the foregoing figures. Referring to FIGS. 28A, 28B and 28C, the reference numeral 4A designates an image read-out head and 4B designates an erasing head which are separately moved by head supporting members 42 and 52. The erasing head supporting member 52 is fed by a screw rod 51 rotated by a drive motor 55 provided separately from the motor 45 which drives the other screw rod 41 for feeding the image read-out head 4A. Hence, two head movement means 40 and 50 are provided in this embodiment. The erasing head 4B is moved by the motor 55 which is controlled according to the output of a stored radiation detecting means which comprises a phototimer 614.

In operation, the image read-out head 4A is first moved to the left in FIG. 28A to carry out the image read-out at a speed appropriate for the image read-out. Then, the erasing head 4B is moved the left as shown in FIG. 28B to carry out the erasing at a speed appropriate for the erasing. The erasing head 4B may start simultaneously with the image read-out head 4A. Then, the erasing head 4B finishes the erasing after the image read-out head 4A finishes the read-out. Thereafter, the erasing head 4B is moved backward together with the image read out head 4A as shown in FIG. 28C. At this stage, the erasing head 4B may repeat the erasing on the way back to the right in case where the erasing is insufficient by the forward movement. The speed and the mode of movement of the erasing head 4B is controlled by a motor driver as said motor driver 46 employed in the embodiment shown in FIG. 25.

Figure 29:
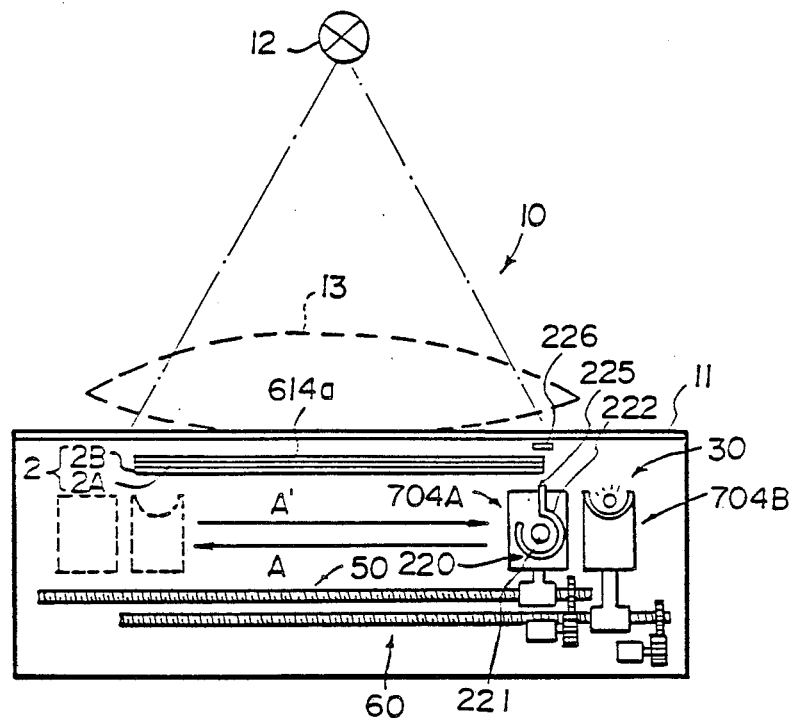
FIGS. 29 and 30 are side views showing further embodiments of the sixth radiation image recording and read-out apparatus in accordance with the present invention.

The image read-out head 4A may be of the type as said image read-out means 640 employing the elongated fluorescent lamp 221 and a fluorescent light guide member 222 together with a line sensor 226 as shown in FIG. 26. Such an embodiment is shown in FIG. 29 in which such an image read-out head 704A is combined with the separate erasing head 704B.

Figure 30:
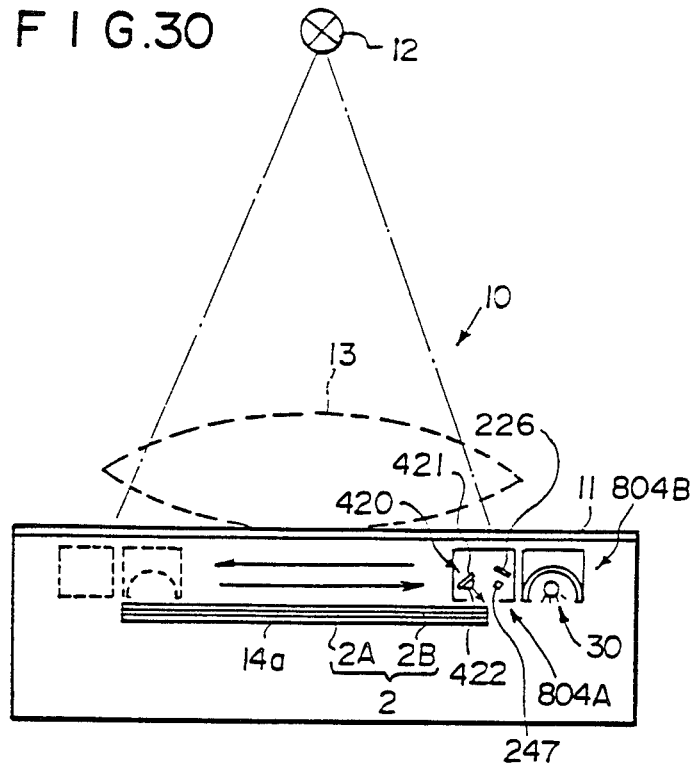
Figure 31:
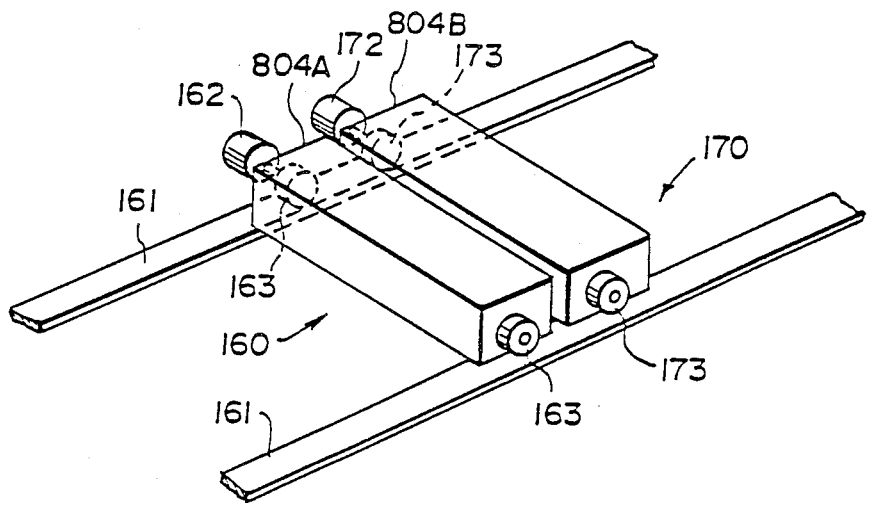
FIG. 31 is a perspective view showing the read-out and erasing unit in the embodiment shown in FIG. 30, and FIGS. 32A, 32B, 32C, 32D, 33A, 33B, 33C and 33D are side views showing still further embodiments of the sixth radiation image recording and read-out apparatus in accordance with the present invention.

Further, the image read-out head 4A may be of the type as said image read-out means 420 as employed in the embodiment shown in FIG. 27. Such an embodiment is shown in FIG. 30, in which the image read-out head is designated by 804A and the erasing head is designated by 804B. As obvious from the drawing, this embodiment is a combination of the embodiment shown in FIGS. 28A to 28C and the embodiment shown in FIG. 27. The operation thereof is the same as that of the embodiment shown in FIGS. 28A to 28C. The image read-out head 804A and the erasing head 804B are moved in the space between the image recording table 11 and the stimulable phosphor sheet 2 by image read-out head movement means 160 and erasing head movement means 170 as shown in FIG. 31. The movement means 160 and 170 are guided along rails 161 by means of wheels 163 and 173 which are driven by motors 162 and 172, respectively.

In the above-described embodiments shown in FIGS. 28A to 31, one erasing head 4B, 704B, 804B and one image read-out head 4A, 704A and 804A are provided to constitute the image read-out means and the erasing means. However, it is possible or more desirable to provide two erasing heads or two image read-out heads to work with one image read-out head or one erasing head so that the image read-out and the erasing can be carried out in the course of both movements as the above-described embodiments shown in FIGS. 20A, 20B, 21, 22 and 23. Such embodiments will now be described with reference to FIGS. 32A to 32D and 33A to 33D.

Referring to FIGS. 32A to 32D, two erasing heads 306A and 306B are provided on both sides of an image read-out head 304. The structure or type of the erasing heads 306A, 306B and the image read-out head 304 may be of any type among those described so far in the various embodiments. The three heads 304, 306A and 306B are made movable independently of each other along the stimulable phosphor sheet 2. After the stimulable phosphor sheet 2 is exposed to a radiation through an object 13, the image read-out head 304 is moved along the stimulable phosphor sheet 2 in the direction of arrow A as shown in FIG. 32B. At this time, the left (as viewed in the drawings) erasing head 306B is moved together with the image read-out head 304 without working or may be moved faster than the read-out head 304. Then, the right erasing head 306A is moved after the read-out head 304 at an appropriate speed for erasing being controlled by a radiation amount detecting means like a phototimer as employed in a foregoing embodiment as shown in FIGS. 24A to 25. When the erasing head 306A finishes the erasing as shown in FIG. 32C, the stimulable phosphor sheet 2 becomes ready for the next recording. Then, after the stimulable phosphor sheet 2 is exposed to the radiation through an object 13 again, the read-out head 304 starts to carry out the image read-out again with the right side erasing head 306A moved ahead thereof in the direction of A'. The left side erasing head 306B follows the read-out head 304 in the direction of B' at the speed appropriate for the erasing being controlled as mentioned above.

This embodiment is advantageous in that the erasing can be carried out at an appropriate speed while the image read-out can be carried out immediately after the recording so that the read-out can be made quickly and the image processing can be initiated early. Further, the image read-out is desired to be initiated early from the viewpoint of quality of image because the recorded energy will fall as the time lapses and the recorded image will be subjected to the natural radiation as the time lapses.

Another embodiment in which two image read-out heads are employed with an erasing head is shown in FIGS. 33A to 33D. Referring to FIGS. 33A to 33D, two image read-out heads 404A and 404B are provided on both sides of an erasing head 406. As obvious from the drawings, one of the two read-out heads 404A first carries out the image read-out and the erasing head 406 carries out the erasing as shown in FIG. 33B. The speed of the erasing head 406 is controlled as the other embodiments so that the erasing can be carried out at an appropriate speed. The second or right side read-out head 404B follows the erasing head 406 in the first reading step. Then, after the three heads 404A, 404B and 406 reached the left end as shown in FIG. 33C, the stimulable phosphor sheet 2 is subjected to the radiation exposure for the next recording. Thereafter, the right side read-out head 404B starts to carry out the image read-out in the direction of A' and the erasing head 406 follows at the speed appropriate for the erasing in the direction of B' as shown in FIG. 33D.

In this embodiment, too, the structure or type of the image read-out head and the erasing head may be of any type among the various types which have been described in the foregoing embodiments.

We claim:

1. A radiation image recording and read-out apparatus comprising:
   (i) a stimulable phosphor sheet,
   (ii) an image recording means for exposing said stimulable phosphor sheet to a radiation passing through an object, thereby to store a radiation image of said object on said stimulable phosphor sheet,
   (iii) a read-out and erasing unit comprising, formed integrally with each other into a unit: (a) an image read-out means provided with a stimulating ray scanning means for scanning said stimulable phosphor sheet carrying said radiation image stored thereon by stimulating rays deflected by a light deflector, and a photoelectric read-out means for photoelectrically detecting light emitted by said stimulable phosphor sheet in proportion to the stored radiation energy at a position of scanning by said stimulating rays, thereby to read out said radiation image, and (b) an erasing means for carrying out erasing by releasing radiation energy remaining on said stimulable phosphor sheet on which the image read-out has been finished, and
   (iv) a unit movement means for reciprocally moving said read-out and erasing unit in a direction approximately normal to the direction of scanning of said stimulating rays, wherein said stimulable phosphor sheet is held at an image recording position facing said image recording means, said read-out and erasing unit is reciprocally moved to face said stimulable phosphor sheet held at said image recording position, carries out the image read-out by said image read-out means in the course of forward movement, and carries out the erasing by said erasing means in the course of backward movement.

2. An apparatus as defined in claim 1 wherein said photoelectric read-out means of said image read-out means comprises a long photomultiplier which has a light receiving face extending along a line of scanning by said stimulating rays, and which is disposed close to said stimulable phosphor sheet.

3. An apparatus as defined in claim 1 wherein said photoelectric read-out means of said image read-out means comprises a fluorescent light guide member obtained by forming a sheet-shaped plastic material containing a phosphor and disposed along a line of scanning by said stimulating rays in such a direction that a surface of said fluorescent light guide member receives the light emitted by said stimulable phosphor sheet, and a photodetector closely contacted with a side end face of said fluorescent light guide member.

4. A radiation image recording and read-out apparatus comprising:
   (i) a stimulable phosphor sheet,
   (ii) an image recording means for exposing said stimulable phosphor sheet to a radiation passing through an object, thereby to store a radiation image of said object on said stimulable phosphor sheet,
   (iii) a read-out and erasing unit comprising, formed integrally with each other into a unit: (a) an image read-out means provided with a stimulating ray irradiation means for linearly irradiating stimulating rays to said stimulable phosphor sheet carrying said radiation image stored thereon, and a line sensor disposed along a position of exposure to said stimulating rays for photoelectrically detecting light emitted by said stimulable phosphor sheet in proportion to the stored radiation energy at said position of exposure to said stimulating rays, thereby to read out said radiation image, and (b) an erasing means for carrying out erasing by releasing radiation energy remaining on said stimulable phosphor sheet on which the image read-out has been finished, and
   (iv) a unit movement means for reciprocally moving said read-out and erasing unit in a direction approximately normal to the length direction of irradiation of said stimulating rays, wherein said stimulable phosphor sheet is held at an image recording position facing said image recording means, said read-out and erasing unit is reciprocally moved to face said stimulable phosphor sheet held at said image recording position, carries out the image read-out by said image read-out means in the course of forward movement, and carries out the erasing by said erasing means in the course of backward movement.

5. An apparatus as defined in claim 4 wherein said stimulating ray irradiation means comprises a light source, and a fluorescent light guide member which is obtained by forming a sheet-shaped material containing a phosphor and which is disposed so that a surface of said fluorescent light guide member receives light produced by said light source and an end face of said fluorescent light guide member stands facing said stimulable phosphor sheet.

6. An apparatus as defined in claim 4 wherein said stimulating ray irradiation means comprises a light emitting diode array, and a cylindrical lens provided on a stimulating ray radiating face of said light emitting diode array.

7. A radiation image recording and read-out apparatus comprising:
(i) a stimulable phosphor sheet,
(ii) an image recording means for exposing said stimulable phosphor sheet to a radiation passing through an object, thereby to store a radiation image of said object on said stimulable phosphor sheet,
(iii) a read-out and erasing unit comprising, formed integrally with each other into a unit: (a) an image read-out means having first and second sides, and provided with a stimulating ray irradiation means for irradiating stimulating rays in a predetermined direction to said stimulable phosphor sheet carrying said radiation image stored thereon, and a photoelectric read-out means for photoelectrically detecting light emitted by said stimulable phosphor sheet in proportion to the stored radiation energy upon exposure to said stimulating rays and generating image signals, and (b) first and second erasing means for carrying out erasing by releasing radiation energy remaining on said stimulable phosphor sheet on which the image read-out has been finished, said first erasing means being provided on the first side of said read-out means and said second erasing means being provided on the second side of said read-out means, a light shielding means being provided between said image read-out means and each of said first and second erasing means, and
(iv) a unit movement means for reciprocally moving said read-out and erasing unit in a direction approximately normal to the length direction of irradiation of said stimulating rays,
wherein said stimulable phosphor sheet is held at an image recording position facing said image recording means, said read-out and erasing unit is reciprocally moved to face said stimulable phosphor sheet held at said image recording position, carries out the image read-out by said image read-out means and the erasing by said first erasing means in the course of forward movement, and carries out the image read-out by said image read-out means and the erasing by said second erasing means in the course of backward movement.

8. An apparatus as defined in claim 7 wherein said stimulating ray irradiation means linearly irradiates said stimulating rays to said stimulable phosphor sheet, and said photoelectric read-out means is a line sensor disposed along the position of irradiation of said stimulating rays.

9. An apparatus as defined in claim 8 wherein said stimulating ray irradiation means comprises a light source, and a fluorescent light guide member which is obtained by forming a sheet-shaped material containing a phosphor and which is disposed so that a surface of said fluorescent light guide member receives light produced by said light source and an end face of said fluorescent light guide member stands facing said stimulable phosphor sheet.

10. An apparatus as defined in claim 8 wherein said stimulating ray irradiation means comprises a light emitting diode array, and a cylindrical lens provided on a stimulating ray radiating face of said light emitting diode array.

11. An apparatus as defined in claim 7 wherein said stimulating ray irradiation means deflects said stimulating rays by a light deflector and scans said stimulating rays on said stimulable phosphor sheet, and said photoelectric read-out means comprises a long photomultiplier which has a light receiving face extending along a line of scanning by said stimulating rays.

12. A radiation image recording and read-out apparatus comprising:
(i) a stimulable phosphor sheet,
(ii) an image recording means for exposing said stimulable phosphor sheet to a radiation having image information, thereby to store radiation image information on said stimulable phosphor
(iii) a read-out and erasing unit comprising, formed integrally with each other into a unit: (a) an image read-out means provided with a stimulating ray irradiation means for irradiating stimulating rays in a predetermined direction to said stimulable phosphor sheet carrying said radiation image stored thereon, and first and second photoelectric read-out means arranged in a direction normal to said predetermined direction for photoelectrically detecting light emitted by said stimulable phosphor sheet in proportion to the stored radiation energy upon exposure to said stimulating rays and generating image signals, and (b) an erasing means disposed between said first and second photoelectric image read-out means for carrying out erasing by releasing radiation energy remaining on said stimulable phosphor sheet on which the image read-out has been finished, a light shielding means being provided between said image read-out means and said erasing means, and
(iv) a unit movement means for reciprocally moving said read-out and erasing unit in a direction approximately normal to the length direction of irradiation of said stimulating rays,
wherein said stimulable phosphor sheet is held at an image recording position facing said image recording means, said read-out and erasing unit is reciprocally moved to face said stimulable phosphor sheet held at said image recording position, carries out the image read-out by said first photoelectric image read-out means and the erasing by said erasing means, in the course of forward movement, and carries out the image read-out by said second photoelectric image read-out means and the erasing by said erasing means, in the course of backward movement.

13. A radiation image recording and read-out apparatus as defined in claim 12 wherein said image read-out means comprises a single stimulating ray irradiation means including an optical path change-over means for changing over the path of the stimulating ray between two predetermined positions, and two photoelectric read-out means repsectively located to at said predetermined two positions to detect light emitted by said stimulable phosphor sheet at the two positions.

14. A radiation image recording and read-out apparatus as defined in claim 13 wherein said two photoelectric read-out means comprise a single photomultiplier and two light guide members respectively located at said two predetermined positions.

15. A radiation image recording and read-out apparatus comprising:
(i) a stimulable phosphor sheet, (ii) an image recording means for exposing said stimulable phosphor sheet to a radiation passing through an object, thereby to store a radiation image of said object on said stimulable phosphor sheet, (iii) a read-out and erasing unit comprising, formed integrally with each other into a unit: (a) an image read-out means provided with a stimulating ray irradiation means for irradiating stimulating rays in a predetermined direction to said stimulable phosphor sheet carrying said radiation image stored thereon, and a photoelectric read-out means for photoelectrically detecting light emitted by said stimulable phosphor sheet in proportion to the stored radiation energy upon exposure to said stimulating rays and generating image signals, and (b) an erasing means, disposed in a direction normal to the direction of irradiation of said stimulating rays for carrying out erasing by releasing radiation energy remaining on said stimulable phosphor sheet on which the image read-out has been finished, light shielding means being provided between said image read-out means and said erasing means, (iv) a unit movement means for reciprocally moving said read-out and erasing unit in a direction approximately normal to said predetermined direction of irradiation of said stimulating rays, and (v) a stored amount detecting means for detecting the stored amount of energy of the radiation image stored by said image recording means on said stimulable phosphor sheet, wherein said stimulable phosphor sheet is held at an image recording position facing said image recording means, said read-out and erasing unit is reciprocally moved to face said stimulable phosphor sheet held at said image recording position, carries out the image read-out by said image read-out means and the erasing by said erasing means by moving said unit at a speed appropriate for the image read-out, in the course of forward movement, and carries out the erasing by said erasing means by moving said unit at a speed appropriate for the erasing in accordance with the output from said stored amount detecting means in the course of backward movement.

16. A radiation image recording and read-out apparatus as defined in claim 15 wherein said stored amount detecting means is a phototimer which controls the amount of radiation to which the stimulable phosphor sheet is exposed to store the radiation image.

17. A radiation image recording and read-out apparatus as defined in claim 15 wherein said stored amount detecting means is an image read-out circuit incorporated in said image read-out means, which provides an output corresponding to the stored amount of the radiation energy based on the read-out image data.

18. A radiation image recording and read-out apparatus comprising:

(i) a stimulable phosphor sheet, (ii) an image recording means for exposing said stimulable phosphor sheet to a radiation passing through an object, thereby to store a radiation image of said object on said stimulable phosphor sheet, (iii) a first read-out head having first and second sides and comprising a stimulating ray irradiation means for irradiating stimulating rays in a predetermined direction to said stimulable phosphor sheet carrying said radiation image stored thereon, and a photoelectric read-out means for photoelectrically detecting light emitted by said stimulable phosphor sheet in proportion to the stored radiation energy upon exposure to said stimulating rays and generating image signals, (iv) a first erasing head, disposed on the first side of said first read-out head, for carrying out erasing by releasing radiation energy remaining on said stimulable phosphor sheet on which the image read-out has been finished, (v) a read-out head movement means for reciprocally moving said first read-out head in a direction normal to said predetermined direction of irradiation of said stimulating rays, and (vi) erasing head movement means for reciprocally moving said first erasing head in a direction normal to said predetermined direction of irradiation of said stimulating rays, wherein said stimulable phosphor sheet is held at an image recording position facing said image recording means, said first read-out head and said first erasing head are reciprocally moved to face said stimulable phosphor sheet held at said image recording position, carries out the image read-out by said first image read-out head and the erasing by said first erasing head in the course of forward movement.

19. A radiation image recording and read-out apparatus as defined in claim 18, further comprising a second erasing head disposed on the second side of the read-out head, and wherein the first read-out head carries out the image read-out in the course of both the forward and backward movements, and wherein said first erasing head carries out the erasing in the course of forward movement, and the second erasing head carries out the erasing in the course of backward movement.

20. A radiation image recording and read-out apparatus as defined in claim 18 further comprising a second read-out head, and wherein said first erasing head has first and second sides, said first read-out head being disposed on the first side of said first erasing head and said second read-out head being disposed on the second side of said first erasing head, said first read-out head carries out image read-out in the course of forward movement, said second read-out head carries out image read-out in the course of backward movement, while the first erasing head carries out the erasing in the course of both movements.

* * * * *